(12) United States Patent
Yokoi et al.

(10) Patent No.: US 8,403,100 B2
(45) Date of Patent: Mar. 26, 2013

(54) VEHICLE AND VEHICLE EXHAUST PIPE

(75) Inventors: Masato Yokoi, Iwata (JP); Shidehiko Miyashiro, Iwata (JP); Hisashi Tajima, Iwata (JP)

(73) Assignee: Yamaha Motor Co., Ltd., Shizuoka-ken (JP)

( * ) Notice: Subject to any disclaimer, the term of this patent is extended or adjusted under 35 U.S.C. 154(b) by 26 days.

(21) Appl. No.: 13/025,429

(22) Filed: Feb. 11, 2011

(65) Prior Publication Data

US 2011/0192669 A1 Aug. 11, 2011

Related U.S. Application Data

(63) Continuation-in-part of application No. 12/461,284, filed on Aug. 6, 2009, now abandoned.

(30) Foreign Application Priority Data

Aug. 8, 2008 (JP) .................................. 2008-206369

(51) Int. Cl.
*B60K 13/04* (2006.01)
(52) U.S. Cl. ......... 180/309; 180/219; 180/225; 180/296
(58) Field of Classification Search .................. 180/218, 180/219, 225, 190, 309, 296; 181/228
See application file for complete search history.

(56) References Cited

U.S. PATENT DOCUMENTS

| | | | |
|---|---|---|---|
| 4,484,651 A | | 11/1984 | Hattori et al. |
| 4,632,210 A | * | 12/1986 | Yamamoto et al. ........... 180/309 |
| 4,637,486 A | | 1/1987 | Iwai |
| 4,696,366 A | | 9/1987 | Hattori |
| 5,575,352 A | | 11/1996 | Suzuki et al. |
| 5,653,303 A | | 8/1997 | Kawamoto |
| 6,637,398 B2 | * | 10/2003 | Suzuki et al. ............. 123/195 R |
| 7,644,800 B2 | | 1/2010 | Adachi et al. |
| 2002/0096385 A1 | | 7/2002 | Kuji et al. |
| 2008/0121455 A1 | | 5/2008 | Ishida |
| 2009/0320785 A1 | * | 12/2009 | Yokoi et al. ................. 123/193.5 |
| 2010/0018792 A1 | * | 1/2010 | Arnold .......................... 180/219 |
| 2010/0018793 A1 | * | 1/2010 | Arnold .......................... 180/229 |

FOREIGN PATENT DOCUMENTS

| | | |
|---|---|---|
| JP | 60-045428 A | 3/1985 |
| JP | 3154340 U | 10/2009 |

* cited by examiner

*Primary Examiner* — Tony Winner
(74) *Attorney, Agent, or Firm* — Rabin & Berdo, P.C.

(57) ABSTRACT

A vehicle, such as a motorcycle, can include an exhaust pipe connected to a back or rear side of an engine of the vehicle. An intermediate portion of the exhaust pipe can extend along a side of the engine from a rear portion connected to the rear side of the engine. A front portion of the exhaust pipe can extend from the intermediate portion along a front of the engine, and an exhaust portion can extend from the intermediate portion along a side of the engine opposite to the intermediate portion side.

34 Claims, 23 Drawing Sheets

VEHICLE AND VEHICLE EXHAUST PIPE

CROSS-REFERENCE TO RELATED APPLICATIONS

This application is a continuation-in-part of U.S. application Ser. No. 12/461,284, filed on Aug. 6, 2009, and now abandoned, which claimed the priority under 35 U.S.C. §119 from Japanese Patent Application No. 2008-206369, filed Aug. 8, 2008, the entireties of which are incorporated herein by reference.

BACKGROUND OF THE INVENTION

1. Field of the Invention

Embodiments of the present invention relate to a vehicle and an exhaust pipe for the vehicle. The vehicle can be a motorcycle, for example. More specifically, the embodiments relate to a vehicle that includes an exhaust pipe connected to a back side of an engine. The engine can be a single-cylinder engine, for example.

2. Background

There are known motorcycles that have an exhaust pipe connected to a back side of an engine. JP S60-45428 A discloses a motorcycle that includes an engine having an outlet port at a back side of the engine and an exhaust pipe connected to the outlet port. An exhaust chamber is connected to the exhaust pipe of the motorcycle and provided under a back end of the engine. The exhaust pipe of the motorcycle is formed to extend backward and downward from the outlet port of the engine.

SUMMARY OF THE INVENTION

Embodiments of the present invention relate to a vehicle and an exhaust pipe for the vehicle. The exhaust pipe can be formed so as to have a sufficient length when connected to a back side of an engine of the vehicle.

In embodiments, the vehicle can be a motorcycle. A motorcycle according to the embodiments can include an engine and an exhaust pipe connected to a back side of the engine. The exhaust pipe can include first to third portions. The first portion can be connected to the back side of the engine, and extend forward from the back side of the engine on one side of the engine, with respect to a widthwise direction of the motorcycle. The second portion can be connected to a downstream side of the first portion and extend in front of the engine from the one side to another side, with respect to the widthwise direction of the motorcycle. The third portion can be connected to a downstream side of the second portion and extend to the back side of the engine along a body of the motorcycle. The engine can be a single-cylinder engine, for example.

With the above-described arrangement, even though the exhaust pipe is connected to the back side of the engine, the exhaust pipe can have a sufficient length.

According to the embodiments, the motorcycle can further include a head pipe and a frame portion. The frame portion can be provided ahead of the engine and extend backward and downward from the head pipe. The second portion can extend between the engine and the frame portion. With this configuration, space between the engine and the frame portion can effectively be used to provide the exhaust pipe.

Further, according to the embodiments, the engine can include a cylinder having an axial line inclined backward with respect to a substantially vertical line. In this way, weight of the engine can be balanced on a center side of the motorcycle, and the exhaust pipe can be provided in a space in front of the engine formed by the backward inclination of the axial line.

Embodiments of the invention can further relate to an exhaust pipe for a vehicle, comprising a rear portion to connect to a rear part of an engine, an intermediate portion to extend from the rear portion along a first side of the engine, a front portion to extend from the intermediate portion along a front of the engine, and an exhaust portion to extend from the front portion along a second side opposite the first side. Moreover, embodiments of the invention can relate to a vehicle exhaust pipe formed to connect to a rear part of an engine of the vehicle, and wrap around a front of the engine to exhaust toward a rear of the engine.

Other features, elements, steps, characteristics and advantages of the present invention will become more apparent from the following detailed description of embodiments of the invention with reference to the attached drawings.

DETAILED DESCRIPTION OF THE INVENTION

Figure 1:
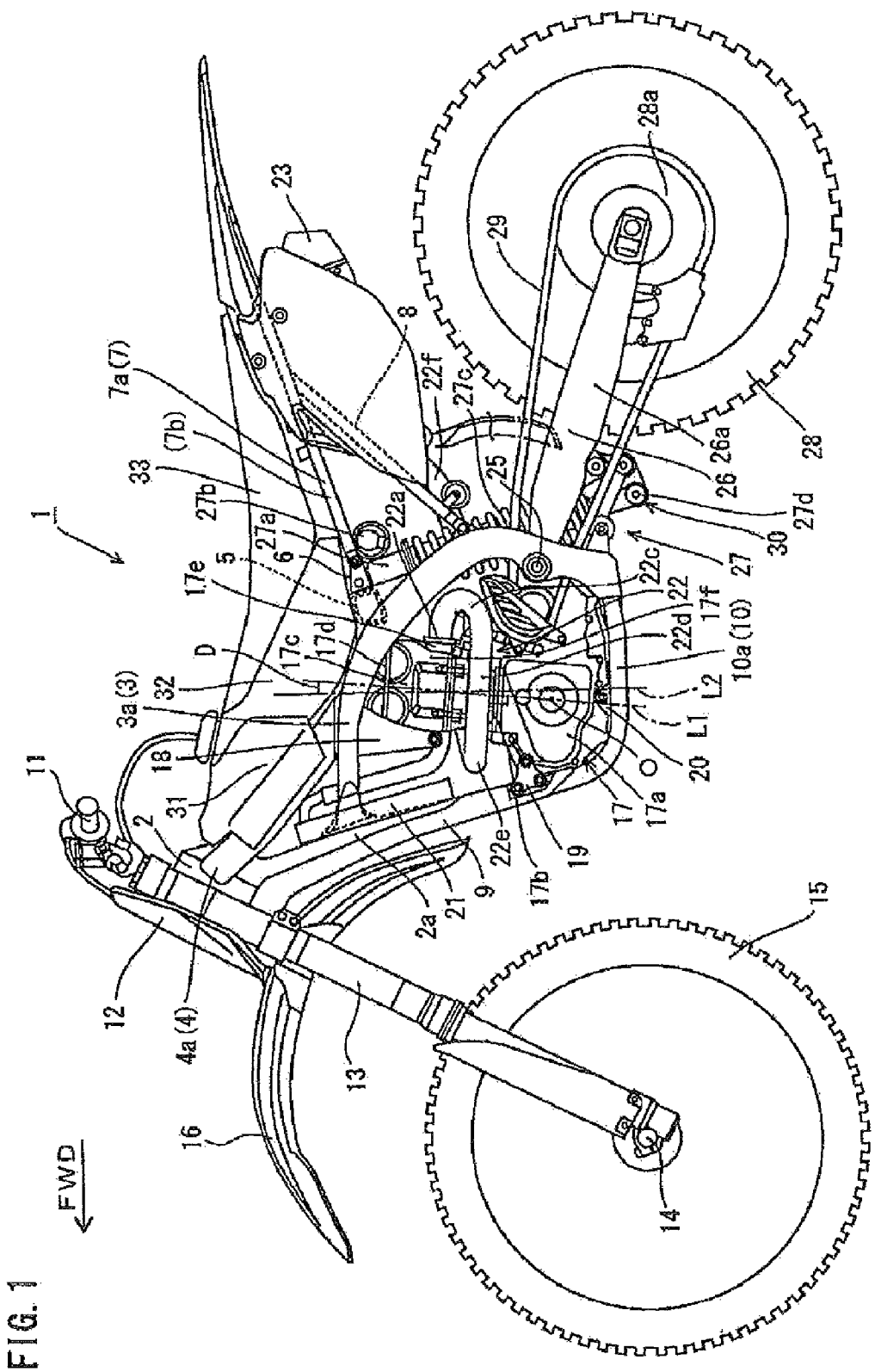
FIG. 1 is a left side view of a motorcycle according to a first embodiment of the present invention.

The invention will now be described in more detail by way of example with reference to the embodiments shown in the accompanying Figures. It should be kept in mind that the following described embodiments are only presented by way of example and should not be construed as limiting the inventive concept to any particular physical configuration. It should further be understood that "exemplary" as used herein means "serving as an example, instance or illustration." Any aspect referred to herein as "exemplary" is not necessarily to be construed as preferred over other aspects.

Further, if used and unless otherwise stated, the terms "upper," "lower," "front," "back," "over," "under," and similar such terms are not to be construed as limiting the invention to a particular orientation. Instead, these terms are used only on a relative basis.

Moreover, any term of degree used herein, such as "substantially," "essentially," "nearly" and "approximately" means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

Additionally, the following description includes references to directions, such as "front," "ahead," "back," "rear," "behind," "right," "left," "upward," "downward," "forward," "backward," "widthwise," "horizontal" and "vertical." As used herein, these terms reflect the perspective of a person facing in the direction indicated by the arrow labeled "FWD" in the drawings, such as a rider seated on or straddling the motorcycle 1 and facing toward the front wheel 15. Thus, the arrow labeled "FWD" can indicate a back-to-front direction relative to the motorcycle 1, or an advancing direction of the motorcycle 1. A direction specified as "left" or "right" in the description refers to left or right with respect to the back-to-front or advancing direction (FWD). "Widthwise" may correspond substantially to a direction substantially transverse to the FWD or back-to-front direction. "Vertical" may refer to a direction substantially transverse to both the widthwise and back-to-front directions, and correspond substantially to "upward" and/or "downward." "Horizontal" may refer to a direction substantially transverse to the vertical direction.

The following describes exemplary first to fifth embodiments of the present invention with reference to the accompanying drawings. As previously described, the first to fifth embodiments relate to a vehicle, such as a motorcycle, and may more particularly relate to an off-road-type motorcycle. However, embodiments of the invention are not limited to a particular type of vehicle or motorcycle. For example, embodiments of the invention can be implemented in an on-road-type motorcycle, such as a motor scooter, or in other types of vehicles such as an automobile, a tricycle, or an ATV (All Terrain Vehicle).

First Embodiment

Figure 2:
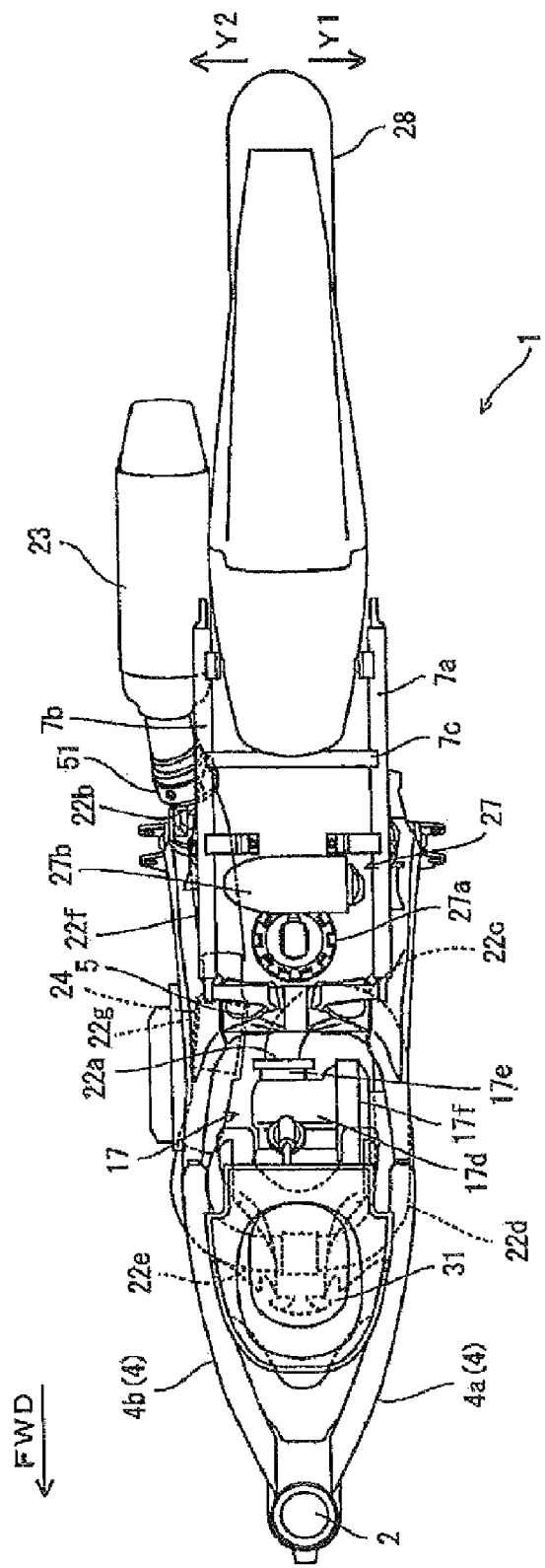
FIG. 2 is a plan view of the motorcycle according to the first embodiment.

Referring to FIGS. 1 to 6, the motorcycle 1 according to the first embodiment of the present invention will be described. FIG. 1 is a left side view of the motorcycle 1. FIG. 2 is a plan view of the motorcycle 1.

Referring to FIG. 1, the motorcycle 1 can include a head pipe 2 in front of a motorcycle body. A handle 11 can be attached at an upper part of the head pipe 2 so that the handle 11 can rotate, e.g., in a substantially horizontal direction. A race number plate 12 that can cover a front of the head pipe 2 can be attached in front of the head pipe 2. A pair of front forks 13 can be provided under the head pipe 2.

An axle 14 can be fixed at a lower end of the pair of front forks 13. A front wheel 15 can be rotatably provided at the axle 14. A front fender 16 that can cover a top of the front wheel 15 can be provided above the front wheel 15.

A connecting frame 2a can be connected to the head pipe 2. The connecting frame 2a can be formed to extend backward and downward from the head pipe 2. The connecting frame 2a can be connected with a main frame 3. A tank frame 4 can be provided between the main frame 3 and the head pipe 2. As shown in FIG. 2, the tank frame 4 can include left and right tank frames 4a and 4b.

Referring back to FIG. 1, an air cleaner 31 can be provided on the tank frame 4. A fuel tank 32 formed, e.g., from resin, can be provided to extend behind the air cleaner 31 at a back side of the air cleaner 31. A front part of a seat 33 can be provided on the fuel tank 32. The seat 33 can be formed to extend behind the fuel tank 32. An engine 17 can be provided under the main frame 3.

The main frame 3 can be provided with a pivot axis 25. A rear arm 26 can be supported at the pivot axis 25. The rear arm 26 can be supported so that it can rotate in a substantially or approximately vertical direction around the pivot axis 25. The rear arm 26 can include a left arm 26a and a right arm that is not shown. A rear wheel 28 can be rotatably provided at a rear end of the rear arm 26.

A driven sprocket 28a that rotates together with the rear wheel 28 can be provided at the rear wheel 28. A chain 29 can be wound around the driven sprocket 28a and the chain 29 can be driven by the engine 17. The driven sprocket 28a and the chain 29 can be provided on a left side in a widthwise direction of the motorcycle 1.

Figure 3:
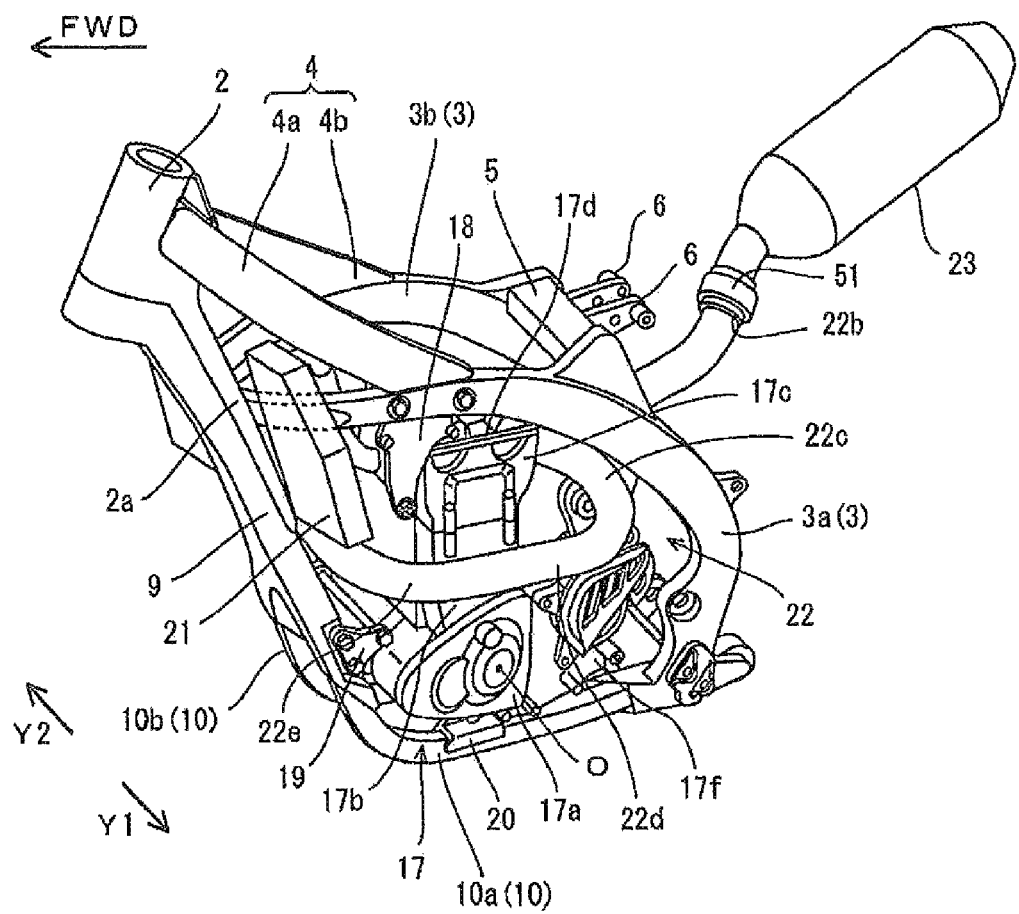
FIG. 3 is a perspective view of a frame structure of the motorcycle according to the first embodiment, including an exhaust pipe as seen obliquely from the upper left.
Figure 4:
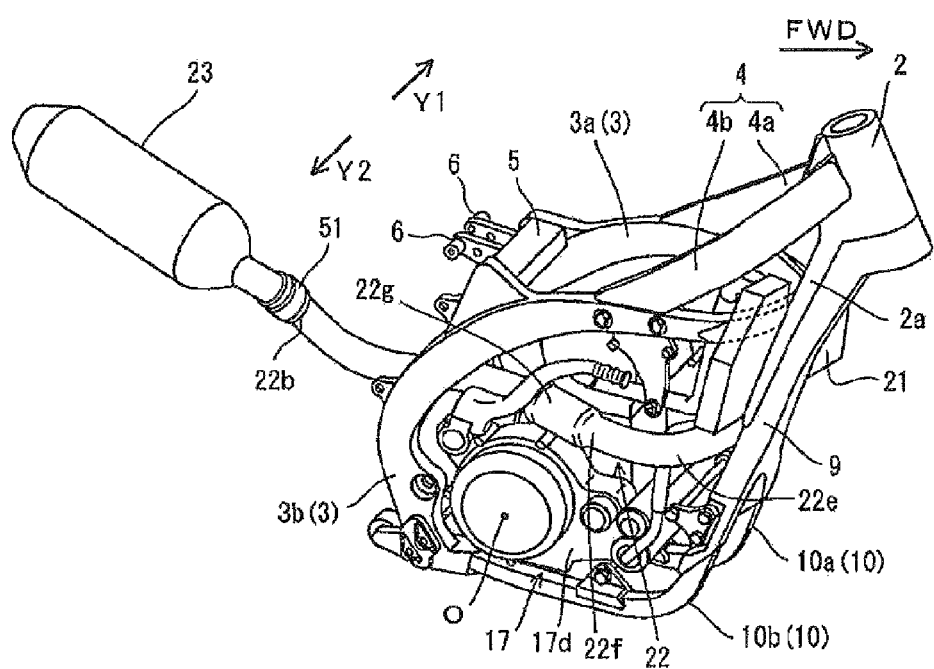
FIG. 4 is a perspective view of a frame structure of the motorcycle according to the first embodiment, including the exhaust pipe as seen obliquely from the upper right.

FIG. 3 is a perspective view of a frame structure of the motorcycle 1 including an exhaust pipe seen obliquely from the upper left. FIG. 4 is a perspective view of a frame structure of the motorcycle 1 including the exhaust pipe seen obliquely from the upper right.

As shown in FIG. 3, the connecting frame 2a can be connected with a left main frame 3a of the main frame 3. As shown in FIG. 4, the connecting frame 2a can be connected with a right main frame 3b of the main frame 3. The left and right main frames 3a and 3b can extend backward and downward in a curve.

Left and right tank frames 4a and 4b can be provided between a rear part of the head pipe 2 and upper parts of the left and right main frames 3a and 3b, respectively. A tank frame 4 including the left and right tank frames 4a and 4b can support a front part of the fuel tank 32 as shown in FIG. 1. The air cleaner 31 can be attached between the left and right tank frames 4a and 4b as shown in FIG. 2.

As shown in FIGS. 3 and 4, upper parts of the left and right main frames 3a and 3b can be connected by a connection member 5. The connection member 5 can include a support member 6 that projects backward. The support member 6 can be connected with left and right seat frames 7a and 7b that extend backward and upward as shown in FIGS. 1 and 2. The support member 6 can be also connected with a rear cushioning member 27.

As shown in FIG. 2, a connection plate 7c that connects the left and right seat frames 7a and 7b can be provided between the left and right seat frames 7a and 7b. A seat frame 7 can include the left and right seat frames 7a and 7b and the connection plate 7c. As shown in FIG. 1, a back stay 8 can be attached between the main frame 3 and the seat frame 7.

As shown in FIGS. 3 and 4, a down frame 9 that extends backward and downward can be connected to a lower end of the head pipe 2. A lower frame 10 can include lower left and right frames 10a and 10b, which can be connected to a lower end of the down frame 9. The lower left and right frames 10a and 10b can be arranged to extend backward and connect to lower ends of the left and right main frames 3a and 3b.

As shown in FIG. 1, the engine 17 can be arranged under the main frame 3 and behind the down frame 9. The engine 17 according to the embodiment under discussion can be a single-cylinder engine (e.g., an engine having one cylinder), for example. The engine 17 can be fixed by a support plate 18 fixed to the main frame 3, a support plate 19 fixed to the down frame 9, and a support plate 20 fixed to the lower frame 10. As shown in FIG. 1, in the engine 17, a cylinder axial line L1 can be inclined backward by an angle D (such as 5 degrees) with respect to a substantially vertical line L2.

The engine 17 can include a crank case 17a that stores a rotating crankshaft (not shown), a cylinder part 17b, a cylinder head 17c provided on the cylinder part 17b, and a cylinder head cover 17d. The cylinder part 17b of the engine 17 can include one cylinder (not shown). The cylinder head 17c of the engine 17 can include an intake port (not shown) that extends ahead of the engine 17 and an exhaust port 17e that extends behind the engine 17. More specifically, the engine 17 can be a front-intake rear-exhaust type single-cylinder engine.

A radiator 21 used to cool the engine 17 can be provided between the down frame 9 and the engine 17.

As shown in FIGS. 1 and 2, the rear cushioning member 27 (e.g., a shock absorber) can be provided behind the main frame 3 and in front of the rear wheel 28. The rear cushioning member 27 can include a main body 27a and a sub tank 27b connected to the main body 27a. A compression coil spring 27c can be provided about an outer circumference of the main body 27a of the rear cushioning member 27. The main body 27a can be compressed and expanded in an approximately vertical direction so that it absorbs impact given when the rear wheel 28 moves in an approximately vertical direction. The main body 27a can be rotatably attached to the support member 6, so that, for example, the main body 27a can rotate in an approximately or substantially vertical direction.

A lower part of the main body 27a can be coupled to the rear arm 26 through a link mechanism 30. An attachment part 27d can be provided at a lower side of the main body 27a. The attachment part 27d can be attached to the link mechanism 30 through a connection member. In this way, impact caused when the rear arm 26 and the rear wheel 28 move in a vertical direction can be absorbed.

As shown in FIG. 1, an engine side end portion 22a of an exhaust pipe 22 that carries exhaust gas out from the engine 17 can be connected to a back surface of the cylinder head 17c of the engine 17. As shown in FIG. 3, the exhaust pipe 22 can extend forward from a back side of the engine 17 and then around the engine 17. As shown in FIG. 4, the exhaust pipe 22 can further extend from a front of the engine 17 to a back side of the engine 17 where a muffler 23 can be provided. Thus, for example, the exhaust pipe 22 can be said to "wrap around" the engine 17 to exhaust toward a rear of the engine.

Figure 5:
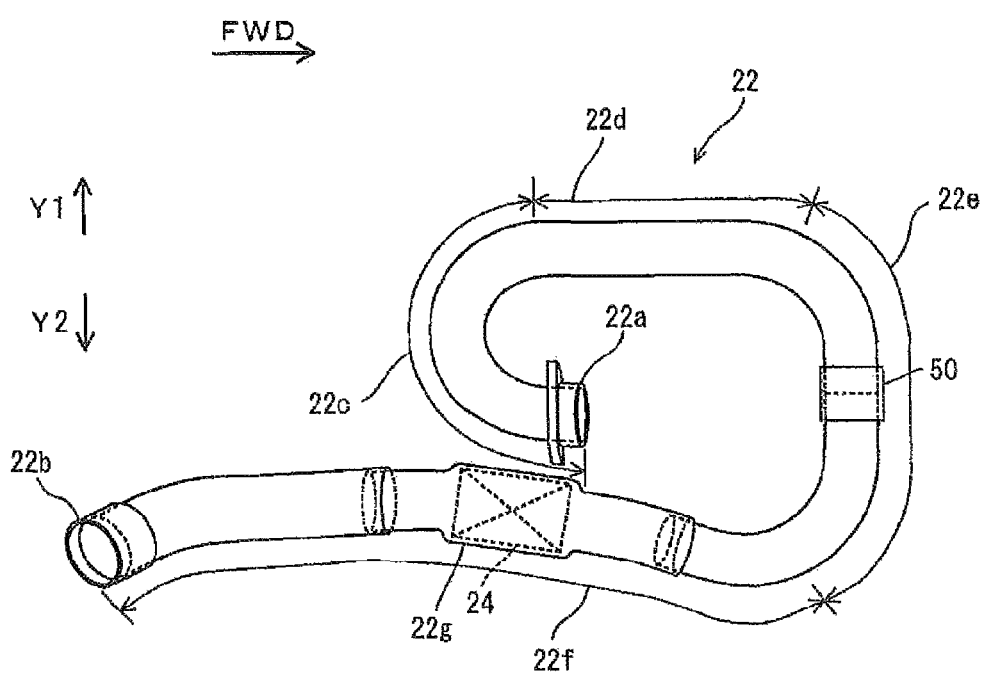
FIG. 5 is a plan view of the exhaust pipe in the motorcycle according to the first embodiment.

FIG. 5 is a plan view of the exhaust pipe 22 in the motorcycle 1. As shown in FIGS. 2 and 5, the engine side end portion 22a of the exhaust pipe 22 can be connected to a back side of the engine 17. The exhaust pipe 22 can include a rear or U-shaped portion 22c that extends backward (in a direction approximately opposite to a direction of the arrow FWD) from the end portion 22a and is then curved to the left. The exhaust pipe 22 can include a left side or intermediate portion 22d that extends forward on a left side (a side indicated by the arrow Y1) of the engine 17. The exhaust pipe 22 can include a front side portion 22e that is connected to a downstream side (front end) of the left side portion 22d and extends in front of the engine 17 to reach a right side (a side indicated by the arrow Y2) of the engine 17. The exhaust pipe 22 can include a right side or exhaust portion 22f that is connected to a downstream side of the front side portion 22e and extends backward on the right side (a side indicated by the arrow Y2) of the engine 17. An exhaust side end portion 22b of the exhaust pipe 22 can be connected with the muffler 23.

As shown in FIG. 5, the front side portion 22e of the exhaust pipe 22 can be divided into left and right sections near the center of the front side portion 22e. The two sections of the front side portion 22e can be connected by a fastening member 50. The U-shaped portion 22c, the left side portion 22d and the left section of the front side portion 22e can be formed to be continuous. Likewise, the right section of the front side portion 22e and a front part of the right side portion 22f can be formed to be continuous.

As shown in FIGS. 1 to 4, the front side portion 22e of the exhaust pipe 22 can be arranged to extend between the cylinder part 17b of the engine 17 and the down frame 9. The front side portion 22e can be arranged above the crank case 17a and under the radiator 21. In this way, the front side portion 22e can be arranged to extend in the region surrounded by the down frame 9, the engine 17 and the radiator 21.

As shown in FIG. 2, the engine 17 can be provided with a cam chain chamber 17f laterally expanded at a left side surface (on a side indicated by the arrow Y1) of the cylinder part 17b. The cam chain chamber 17f can store a cam chain used to drive a cam controlling opening/closing of an intake valve and an exhaust valve that are not shown.

Figure 6:
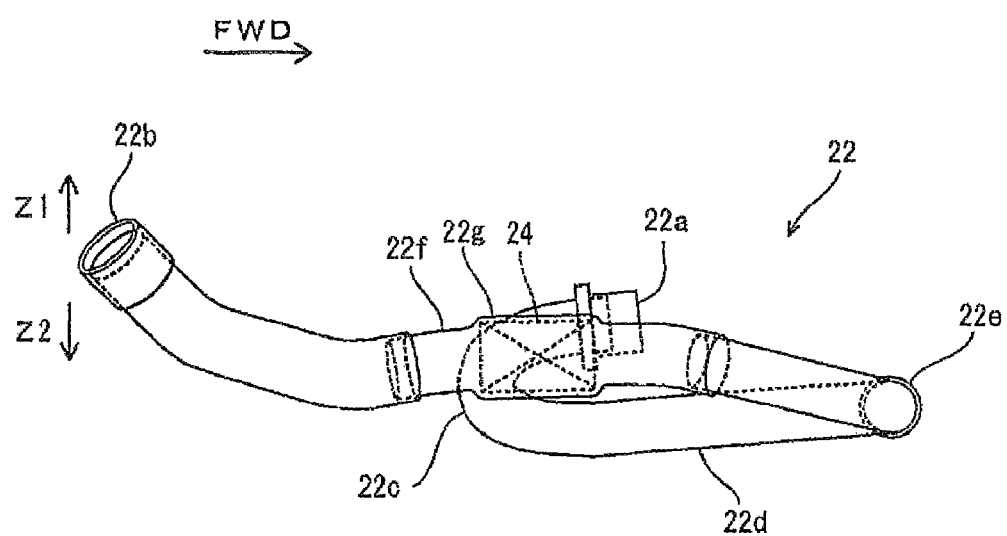
FIG. 6 is a right side view of the exhaust pipe in the motorcycle according to the first embodiment.

FIG. 6 is a right side view of the exhaust pipe 22. The U-shaped portion 22c of the exhaust pipe 22 is formed to extend downward (in a direction indicated by an arrow Z2) from the end portion 22a to the left side portion 22d. As shown in FIG. 6, the right side portion 22f of the exhaust pipe 22 can be formed to extend backward and upward (in a direction indicated by an arrow Z1) from the front side portion 22e.

As shown in FIG. 1, the left side portion 22d and the front side portion 22e of the exhaust pipe 22 can be arranged above a bottom surface of the engine 17. More specifically, the left side portion 22d and the front side portion 22e can be arranged above the crank axial center O of the engine 17. As shown in FIG. 6, a front end of the left side portion 22d and the front side portion 22e can be arranged in the lowest position among all portions of the exhaust pipe 22 except U-shaped portion 22c. In embodiments, a front end of the left side portion 22d and the front side portion 22e can be arranged in the lowest position among all portions of the exhaust pipe 22.

Substantially an entirety of, e.g., all the portions of the exhaust pipe 22 can be arranged above the bottom surface of the engine 17. More specifically, substantially all the portions of the exhaust pipe 22 can be arranged above the crank axial center O of the engine 17.

As shown in FIG. 6, the right side portion 22f of the exhaust pipe 22 can extend backward and upward. The right side portion 22f can include a large diameter portion 22g in a liner part near a center of the right side portion 22f, and a catalytic device 24 can be stored in the expanded portion 22g as shown in FIGS. 5 and 6. The catalytic device 24 can clean exhaust gas discharged from the engine 17.

As shown in FIG. 2, the catalytic device 24 can be stored in the right side portion 22f on an opposite side to the cam chain chamber 17f of the engine 17 with respect to a widthwise direction. The exhaust side end portion 22b of the right side portion 22f can be connected with the muffler 23 through a fastening member 51.

The motorcycle 1 according to the first embodiment can include the exhaust pipe 22 having the above-described structure, and therefore the exhaust pipe 22 can have a sufficient length based on a length of the left side portion 22d that extends forward from the back side of the engine 17, and a length of the right side portion 22f that extends backward from the front of the engine 17. The exhaust pipe 22 can have a greater length than in a case where the exhaust pipe 22 is formed to extend backward from a back side of the engine 17. Furthermore, the front side portion 22e that extends in front of the engine 17 in a widthwise direction can further increase a length of the exhaust pipe 22. In this way, the exhaust pipe 22 can be arranged to surround the engine 17, so that the exhaust pipe 22 can be connected to the back side of the engine 17 while the exhaust pipe 22 can have a sufficient length and the exhaust silencing effect can further be improved.

As described in the foregoing, the cylinder axial line L1 of the engine 17 can be inclined backward. The front side portion 22e can be arranged in a space created in front of the engine 17 by the backward inclination of the cylinder axial line L1, so that weight can be concentrated in a center of a body of the motorcycle 1.

The right side portion 22f can be provided above the bottom of the engine 17, so that the minimum ground clearance of the right side of the motorcycle 1 can be raised. In this way, reduction in the angle (banking angle) at which the motorcycle 1 can be inclined to the right attributable to an arrangement of the exhaust pipe 22 on the right side of the engine 17 can be prevented.

Furthermore, the right side portion 22f can be provided above the crank axial center 0. In this way, the minimum ground clearance of the right side of the motorcycle 1 can be raised.

In addition, not only the right side portion 22f and the front side portion 22e but also substantially all the portions of the exhaust pipe 22 can be provided above the bottom surface of the engine 17, so that the minimum ground clearance of the motorcycle 1 can be raised.

Furthermore, substantially all the portions of the exhaust pipe 22 can be provided above the crank axial center O of the engine 17, so that the minimum ground clearance can further be raised.

The front side portion 22e of the exhaust pipe 22 can be extended between the engine 17 and the down frame 9. Thus, the space created between the engine 17 and the down frame 9 can be used effectively. The exhaust pipe 22 can be provided behind the down frame 9, so that the pipe can be protected against pebbles and sand raised by the front wheel 15.

The front side portion 22e of the exhaust pipe 22 can be provided under the radiator 21, so that the space can be used effectively.

The catalytic device 24 can be provided in the right side portion 22f that is on the opposite side to the cam chain chamber 17f of the engine 17 with respect to a widthwise direction. The catalytic device 24 can be provided in a space formed on the right side of the cylinder part 17b where the cam chain chamber 17f is not provided.

Second Embodiment

Referring to FIGS. 7 to 11, a structure of a motorcycle 100 according to a second embodiment of the present invention will be described. The second embodiment is different from the first embodiment in that an exhaust pipe 122 can be extended in front of the down frame 9. In the second embodiment, portions that are the same as those of the first embodiment are denoted by the same reference numbers, and their description will not be repeated in some cases.

Figure 7:
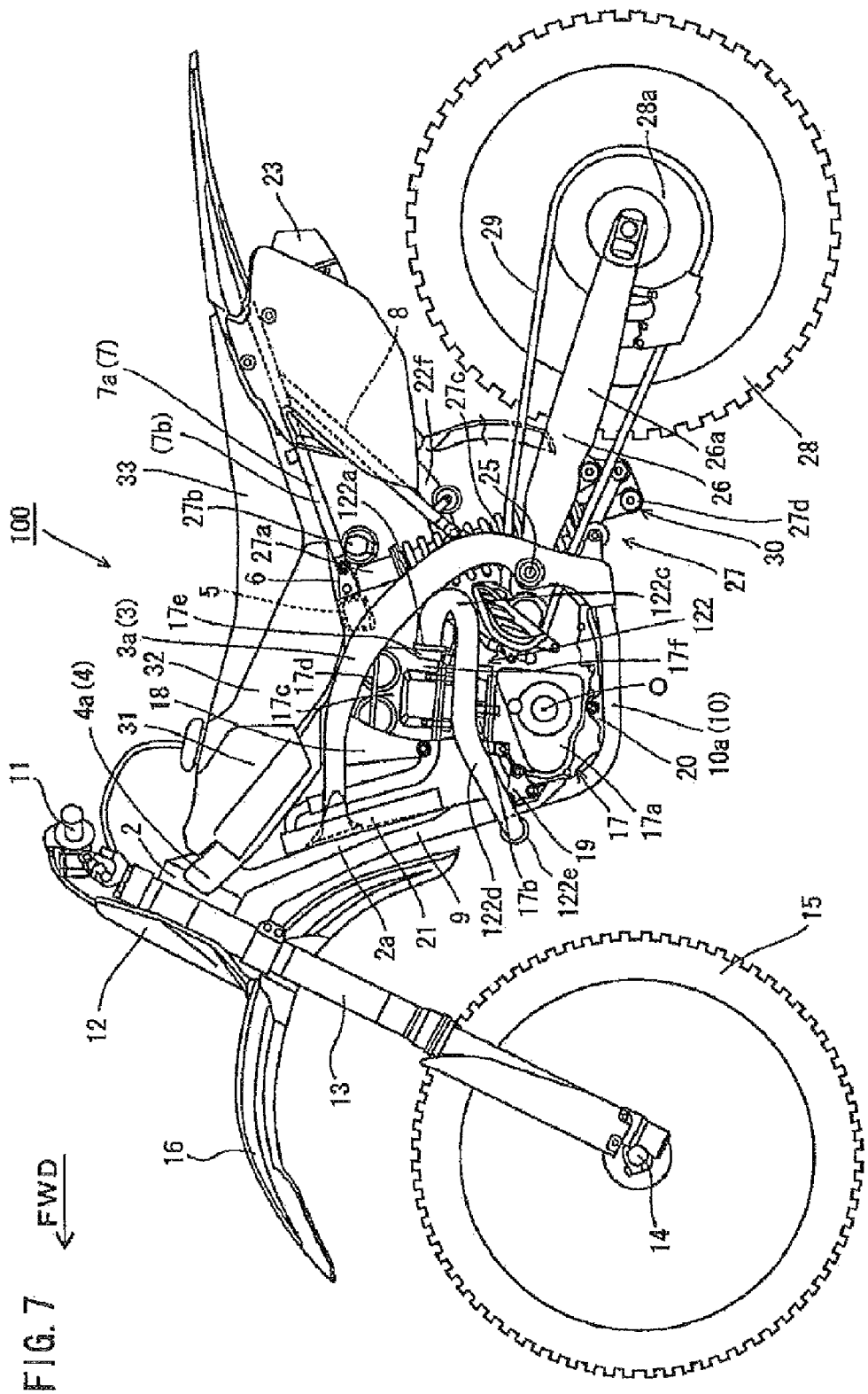
FIG. 7 is a left side view of a motorcycle according to a second embodiment of the present invention.
Figure 8:
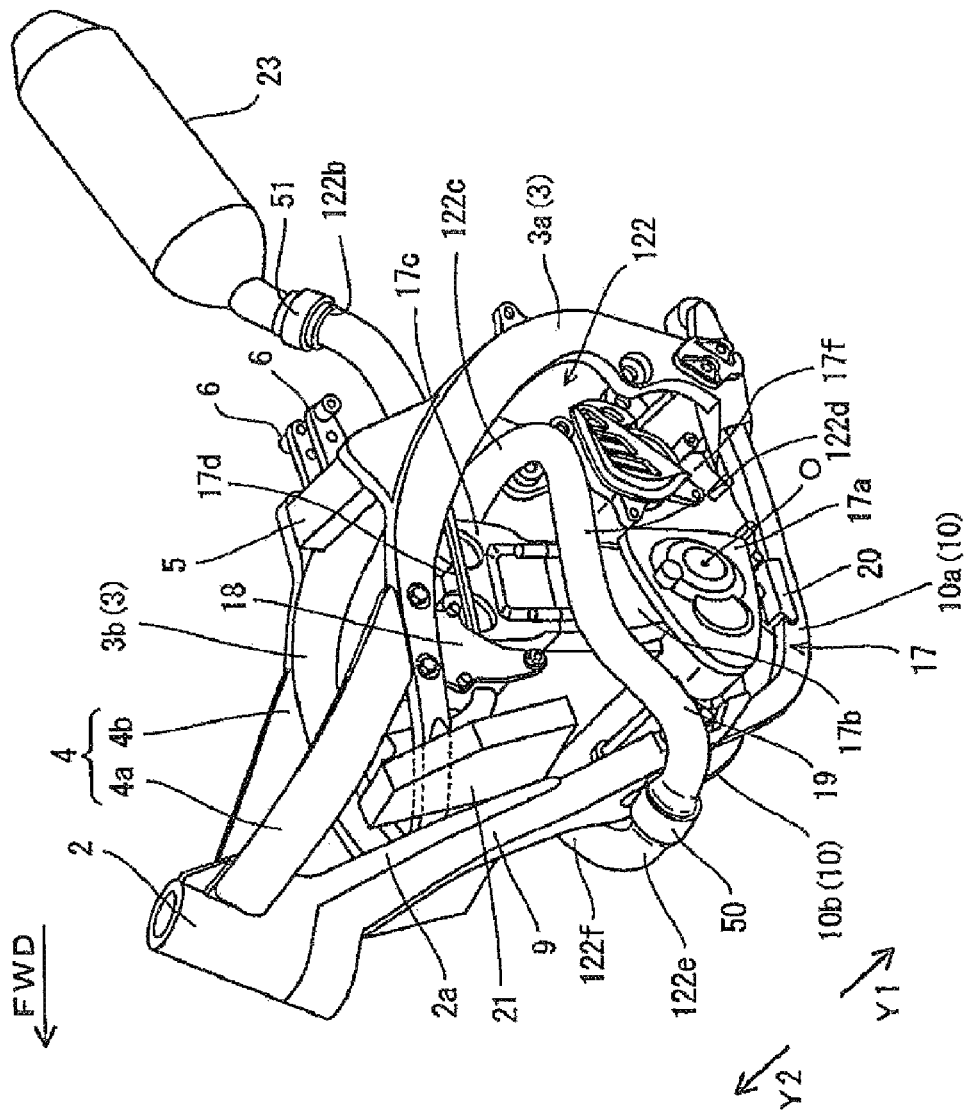
FIG. 8 is a perspective view of a frame structure of the motorcycle according to the second embodiment, including an exhaust pipe as seen obliquely from the upper left.
Figure 9:
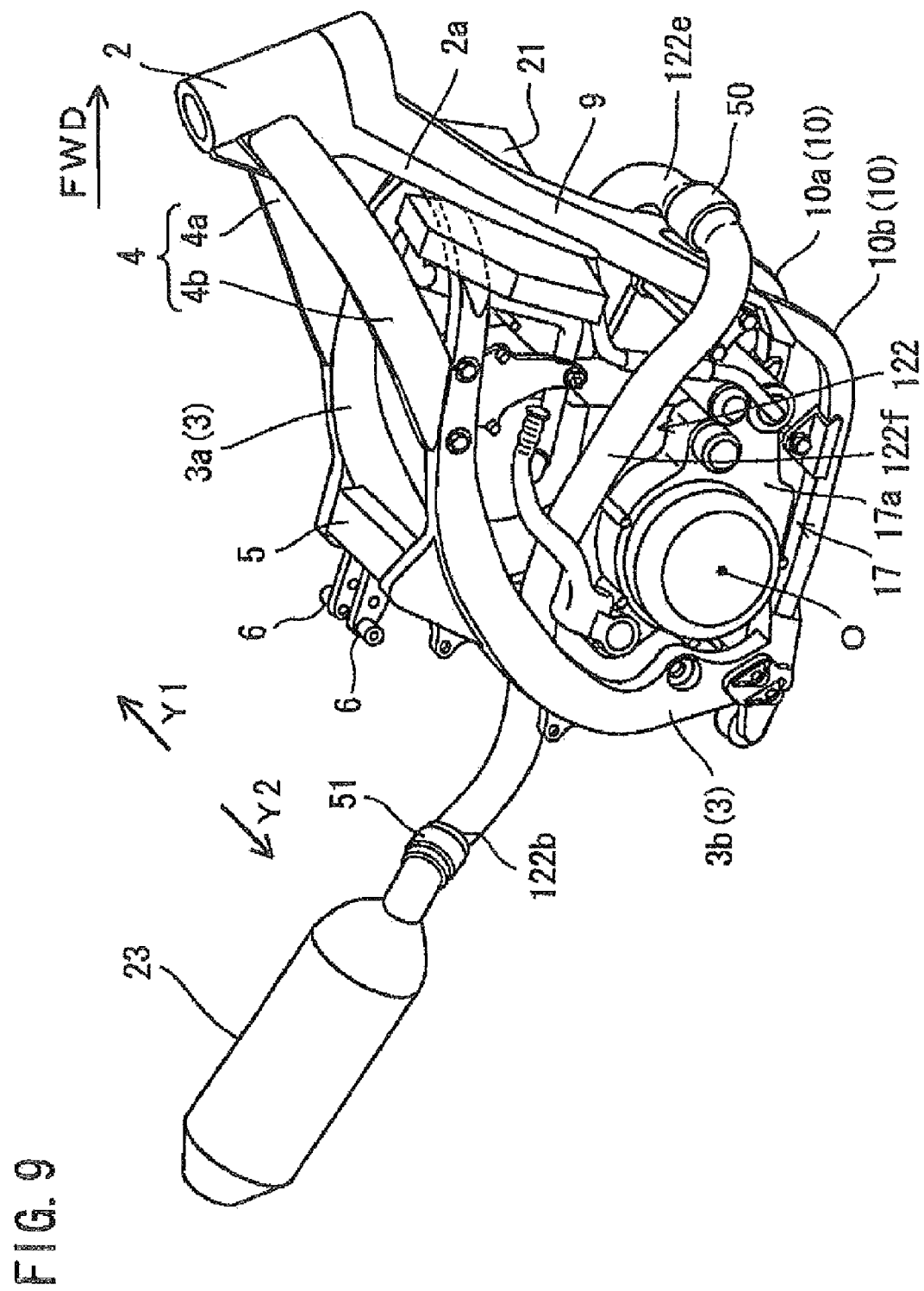
FIG. 9 is a perspective view of frame structure of the motorcycle according to the second embodiment, including the exhaust pipe as seen obliquely from the upper right.

FIG. 7 is a left side view of the motorcycle 100 according to the second embodiment. FIG. 8 is a perspective view of a frame structure of the motorcycle 100 including the exhaust pipe 122 as seen obliquely from the upper left. FIG. 9 is a perspective view of the frame structure of the motorcycle 100 including the exhaust pipe 122 as seen obliquely from the upper right.

As shown in FIGS. 7 to 9, the frame structure includes a head pipe 2, a main frame 3, a tank frame 4, a seat frame 7, a down frame 9, and a lower frame 10 similarly to the first embodiment. The structure and arrangement of an engine 17, an air cleaner 31, a fuel tank 32, and a seat 33 are the same as those of the first embodiment. An engine side end portion 122a of the exhaust pipe 122 can be connected to a back side of the cylinder head 17c of the engine 17.

Figure 10:
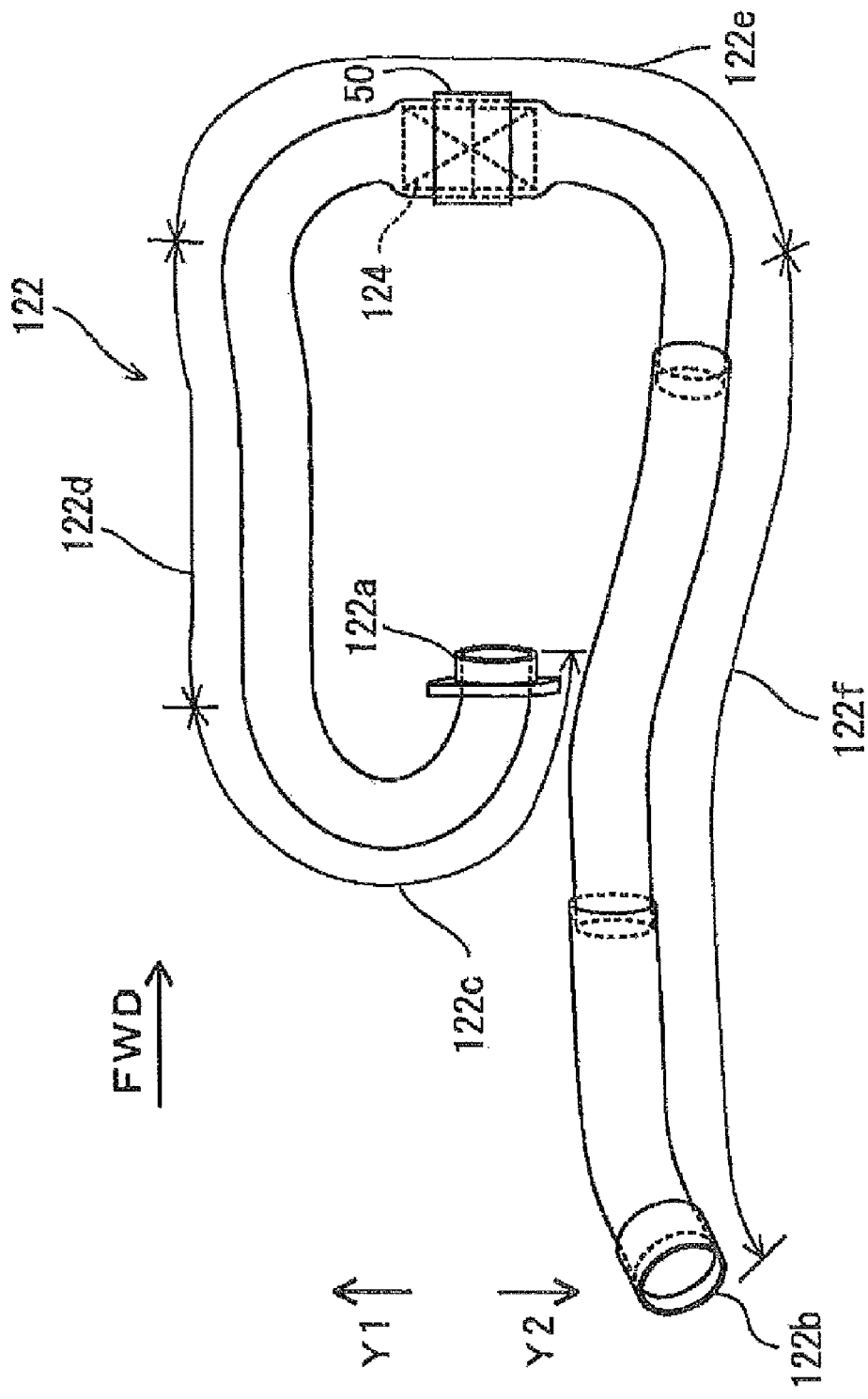
FIG. 10 is a plan view of the exhaust pipe in the motorcycle according to the second embodiment.

FIG. 10 is a plan view of the exhaust pipe 122. The engine side end portion 122a of the exhaust pipe 122 can be connected to a back side of the engine 17. The exhaust pipe 122 can include a U-shaped portion 122c that extends backward (in an opposite direction to a direction denoted by the arrow FWD) from the end portion 122a and is then curved to the left. The exhaust pipe 122 can include a left side portion 122d that extends forward on a left side of the engine 17 (on a side indicated by the arrow Y1). The exhaust pipe 122 can include a front side portion 122e that is connected to a downstream side (front end) of the left side portion 122d and then extends in front of the down frame 9 to the right side of the engine 17 (in a direction indicated by the arrow Y2). The exhaust pipe 122 can include a right side portion 122f that is connected to a downstream side of the front side portion 122e and extends backward on the right side of the engine 17 (on a side indicated by the arrow Y2). An exhaust side end portion 122b of the exhaust pipe 122 can be connected with a muffler 23.

As shown in FIG. 10, the front side portion 122e of the exhaust pipe 122 can be divided into right and left sections in a widthwise direction near the center of the front side portion 122e. The two sections of the front side portion 122e can be connected by a fastening member 50. The U-shaped portion 122c, the left side portion 122d, and the left section of the front side portion 122e can be formed to be continuous. The right section of the front side portion 122e and the front part of the right side portion 122f can be formed to be continuous.

As shown in FIGS. 7 to 9, the exhaust pipe 122 can be arranged to surround a front part of the down frame 9 provided in front of the engine 17. More specifically, the left side portion 122d of the exhaust pipe 122 extends forward from a connection portion with the U-shaped portion 122c and then to the front of the down frame 9 on a left side of the engine 17. Furthermore, the front side portion 122e of the exhaust pipe 122 extends in front of the down frame 9 in a widthwise direction of the motorcycle 1.

As shown in FIG. 7, the left side portion 122d of the exhaust pipe 122 can be formed to extend forward and then obliquely forward and downward. In this way, the front side portion 122e of the exhaust pipe 122 can be arranged to be separated from the front fender 16 and the front wheel 15, so that it does not interfere with the front fender 16 and the front wheel 15 provided ahead of the down frame 9.

As shown in FIGS. 9 and 10, the front side portion 122e can include a portion that has a larger diameter near its center portion. A catalytic device 124 used to clean exhaust gas can be provided in the enlarged-diameter portion of the front side portion 122e.

Figure 11:
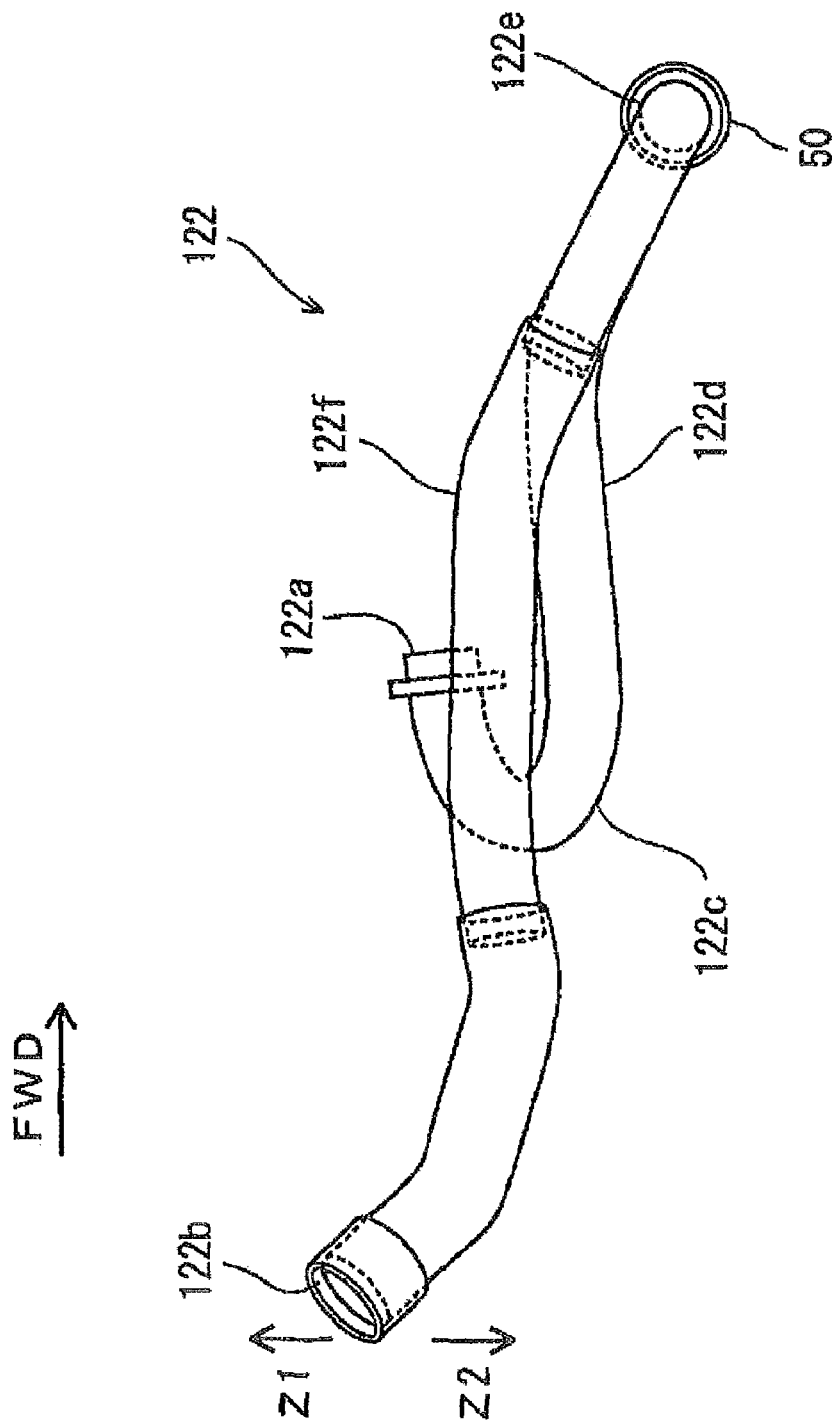
FIG. 11 is a right side view of the exhaust pipe in the motorcycle according to the second embodiment.

FIG. 11 is a right side view of the exhaust pipe 122. As shown in FIG. 11, the front side portion 122e can be arranged in the lowest position among all the portions that form the exhaust pipe 122. As shown in FIG. 7, the front side portion 122e can be positioned above a bottom surface of the engine 17. More specifically, the front side portion 122e can be positioned above the crank axial center O of the engine 17. In other words, substantially all the portions of the exhaust pipe 122 can be provided above the bottom surface of the engine 17. More specifically, substantially all the portions of the exhaust pipe 122 can be provided above the crank axial center O of the engine 17. An end portion 122b of the right side portion 122f can be connected with the muffler 23 through the fastening member 51 (see FIG. 8).

According to the second embodiment, the exhaust pipe 122 can be provided to extend ahead of the down frame 9 as described above, so that the exhaust pipe 122 can have an even larger length.

The catalytic device 124 can be provided in the front side portion 122e that extends in front of the down frame 9. In this way, the catalytic device 124 can be provided nearer to the engine 17 than would be the case if the catalytic device 124 were provided in the right side portion 122f or in the muffler 23. Exhaust gas from the engine 17 can be cleaned by the catalytic device 124 while the exhaust gas is in a high temperature state, and therefore the exhaust gas can effectively be cleaned.

Third Embodiment

Figure 12:
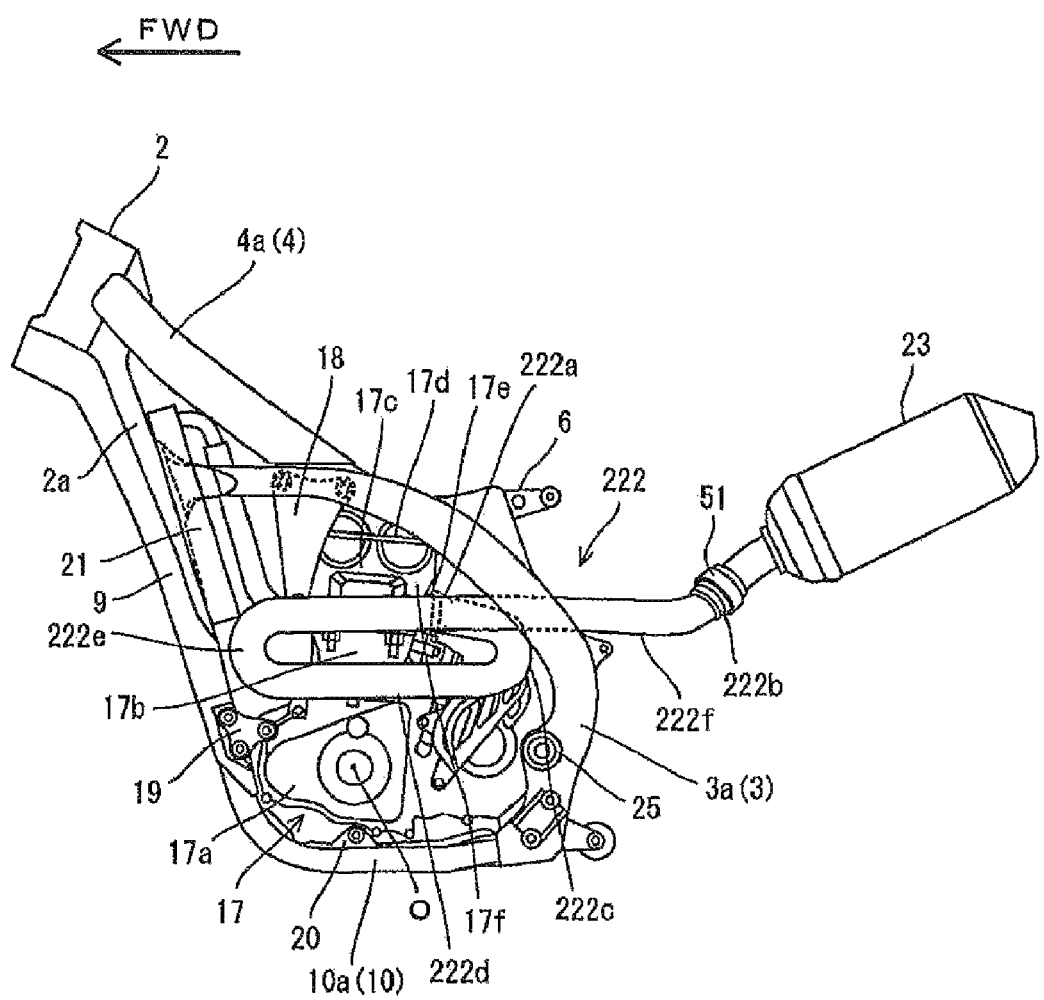
FIG. 12 is a left side view of a frame structure of a motorcycle and an exhaust pipe according to a third embodiment of the present invention.

FIG. 12 is a left side view of structure of an exhaust pipe in a motorcycle according to a third embodiment of the present invention. The third embodiment is different from the first or second embodiment in that an exhaust pipe 222 can be folded on a left side of the engine 17. In the third embodiment, portions that are the same as those of the first embodiment are denoted by the same reference numbers, and their description will not be repeated.

An end portion 222a of the exhaust pipe 222 can be connected to a back side of the engine 17. The exhaust pipe 222 can include a U-shaped portion 222c that extends backward and downward from the end portion 222a and is then folded forward. The exhaust pipe 222 can include an extension portion 222d that extends forward on a left side of the crank case 17a of the engine 17. The exhaust pipe 222 can include a U-shaped portion 222e that is connected to a downstream side (front end) of the extension portion 222d and then folded upward. The exhaust pipe 222 can include an extension portion 222f that is connected to a downstream side of the U-shaped portion 222e and extends backward on a left side of a cylinder portion 17b.

An end portion 222b of the extension portion 222f can be connected with a muffler 23. The U-shaped portion 222e can be provided on a left side of a radiator 21 and behind a down frame 9.

According to the third embodiment, the exhaust pipe 222 can be formed in the above-described manner, so that a length of the exhaust pipe 222 can be large enough based on a length of the extension portion 222d that extends forward from the back side of the engine 17 and a length of the extension portion 222f that extends backward from a front of the engine 17.

Fourth Embodiment

Figure 13:
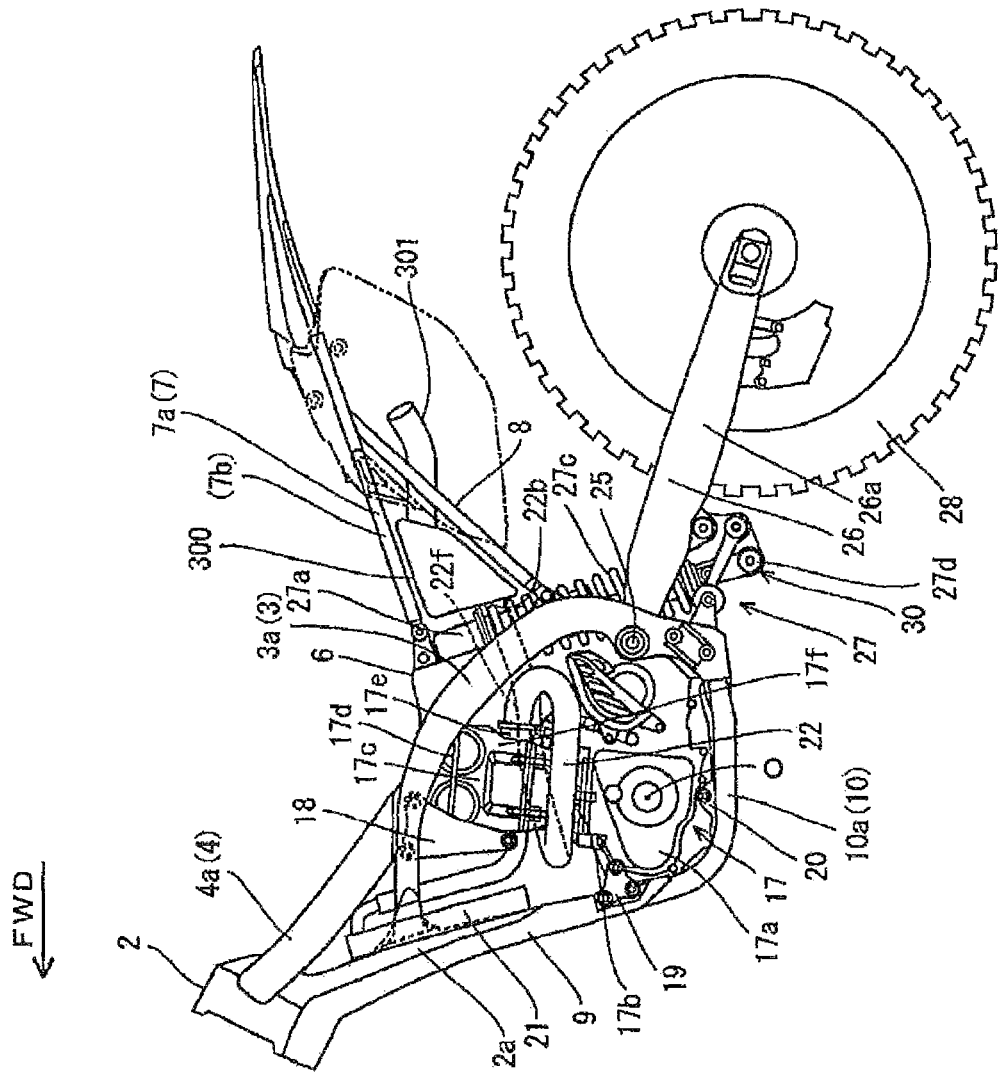
FIG. 13 is a left side view of a frame structure and a structure of an exhaust chamber in a motorcycle according to a fourth embodiment of the present invention.

FIG. 13 is a left side view of structure of an exhaust chamber in a motorcycle according to a fourth embodiment of the present invention. The fourth embodiment is different from the first embodiment in that an exhaust or expansion chamber 300 provided between the rear cushioning member 27 and the rear wheel 28 can be connected with the end portion 22b of the exhaust pipe 22. In the fourth embodiment, portions that are the same as those of the first embodiment are denoted by the same reference numbers, and their description will not be repeated.

The end portion 22b of the right side portion 22f of the exhaust pipe 22 can be connected with the exhaust chamber 300. The exhaust chamber 300 can control exhaust noise by expanding exhaust gas from the engine 17. The exhaust chamber 300 can be provided ahead of the rear wheel 28 and in a space surrounded by the rear cushioning member 27, a seat frame 7 and a back stay 8. A tail pipe 301 used to discharge exhaust gas from the exhaust pipe 22 can be attached at a back of the exhaust chamber 300.

According to the fourth embodiment, the exhaust chamber 300 can be provided in the space surrounded by the rear cushioning member 27, the seat frame 7, and the back stay 8. The exhaust chamber 300, which can-be heavy, can be provided near the engine 17, which can also be heavy. In this way, weight balance can be improved.

Fifth Embodiment

Figure 14:
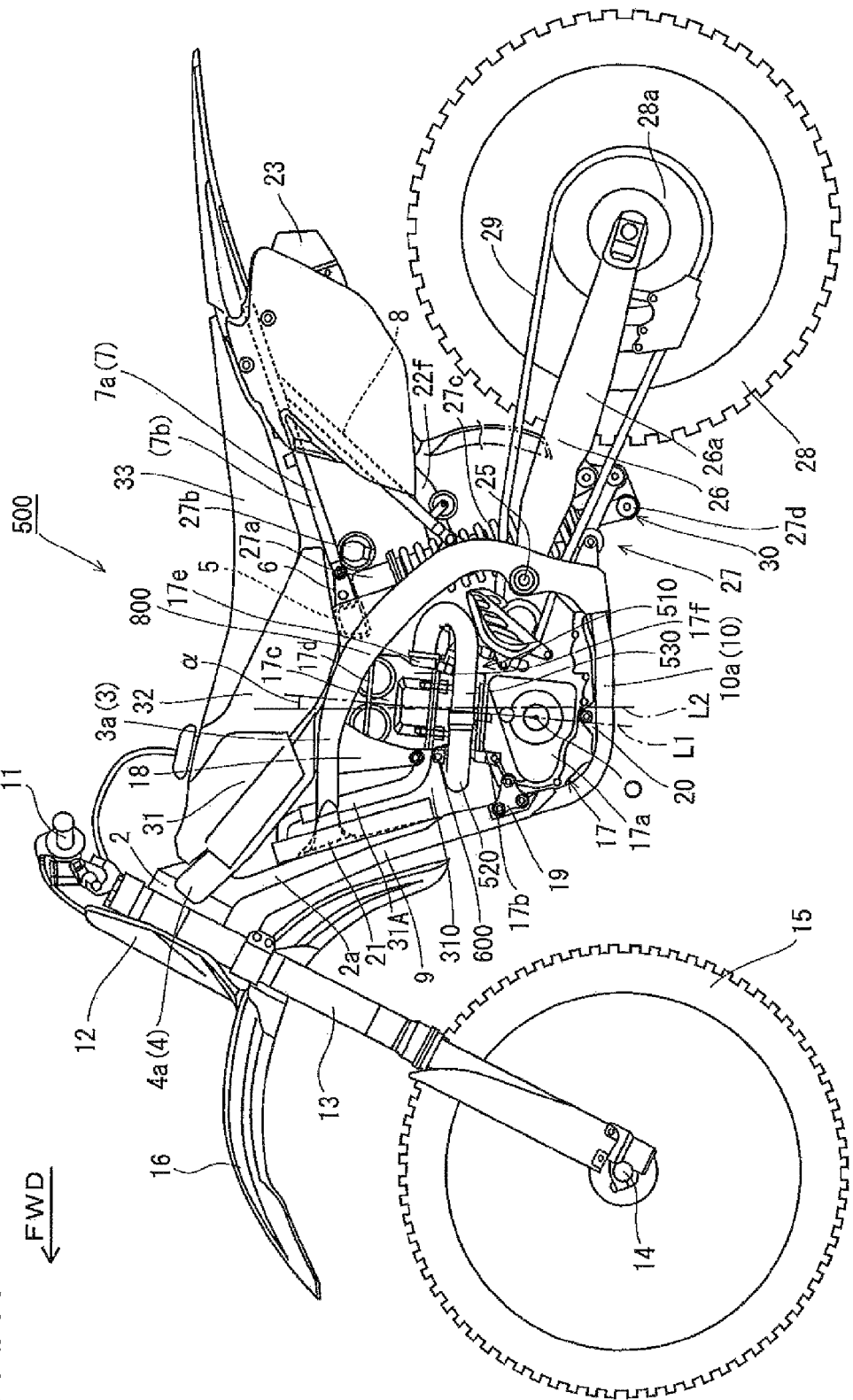
FIG. 14 is a left side view of a motorcycle according to a fifth embodiment of the present invention.

FIG. 14 is a left side view of a motorcycle 500 according to a fifth embodiment of the present invention. Referring to FIG. 14, the motorcycle 500 is different from the motorcycle 1 shown in the first embodiment in that a modified exhaust pipe 510 may be provided in place of the exhaust pipe 22. The motorcycle 500 may further include a support member 600. The exhaust pipe 510 may be connected to engine 17, and connect the engine 17 to muffler 23. The support member 600 is attached to the engine 17 and supports the exhaust pipe 510.

The motorcycle 500 may include a head pipe 2, a connecting frame 2a, a main frame 3, a tank frame 4, a down frame 9, and a lower frame 10, similar to the motorcycle 1.

The down frame 9 may extend downward from the head pipe 2. The main frame 3 and the tank frame 4 together form a rear frame 800. In other words, the rear frame 800 extends obliquely downward from the head pipe 2 toward a rear side of the motorcycle 500. The lower frame 10 may be provided between a lower end of the down frame 9 and a lower end of the rear frame 800.

The head pipe 2, the down frame 9, the rear frame 800, and the lower frame 10 may be integrally formed by welding or the like. The engine 17 may be provided in a region 310 and surrounded by the head pipe 2, the down frame 9, the rear frame 800, and the lower frame 10.

Note that in the motorcycle 1 of the first embodiment (see FIG. 1), the head pipe 2, the main frame 3, the tank frame 4, the down frame 9, and the lower frame 10 may be formed integrally by welding, similar to the motorcycle 500 of the present embodiment.

Structure of Exhaust Pipe 510

Figure 15:
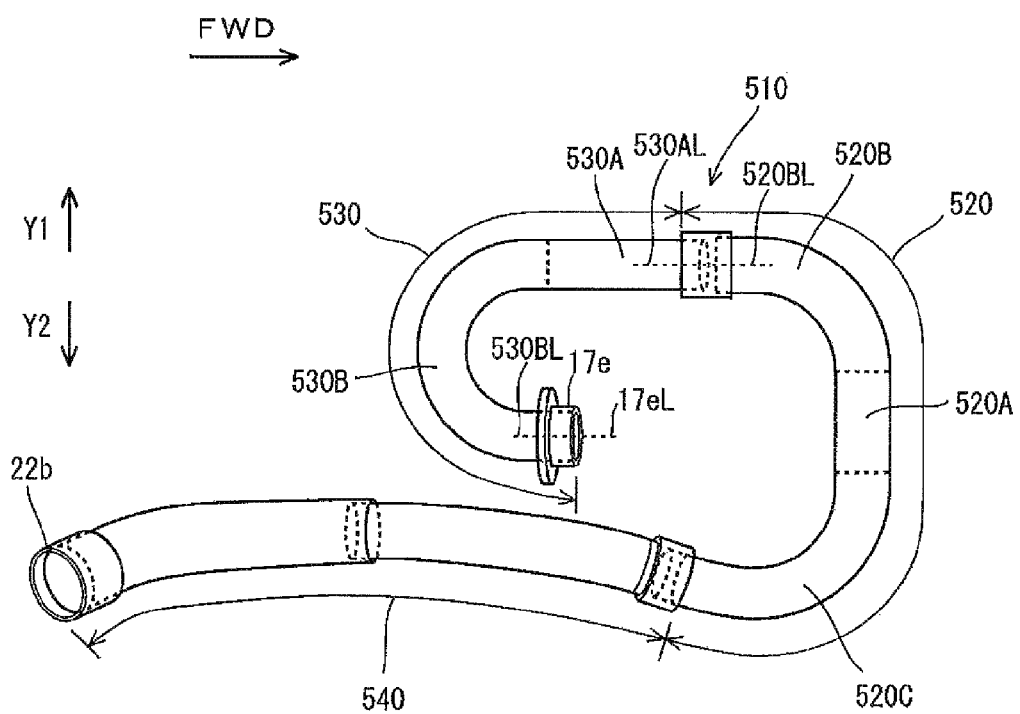
FIG. 15 is a plan view of an exhaust pipe according to the fifth embodiment.

FIG. 15 is a plan view of the exhaust pipe 510. Referring to FIG. 15, the exhaust pipe 510 may include a front pipe 520 and lateral pipes 530 and 540. As shown in FIG. 14, the front pipe 520 may be provided between the down frame 9 and the engine 17. As shown in FIG. 14, the front pipe 520 may be provided above a crank case 17a and under a radiator 21.

Referring to FIG. 15, the front pipe 520 may be U-shaped. The front pipe 520 may include a main body portion 520A and curved portions 520B and 520C. The main body portion 520A may extend in a widthwise direction of the motorcycle 500 (in Y1 and Y2 directions in the drawings). The curved portion 520B may be curved from an upstream end of the main body portion 520A to a rear side of the motorcycle 500. An opening at an upstream end of the curved portion 520B may face the rear side of the motorcycle 500. The curved portion 520C may be curved from a downstream end of the main body portion 520A to the rear side of the motorcycle 500. An opening at a downstream end of the curved portion 520C may face the rear side of the motorcycle 500.

According to the present embodiment, the upstream end of the curved portion 520B may be provided on one lateral side (a left side) of the engine 17 and the downstream end of the curved portion 520C may be provided on the other lateral side (a right side) of the engine 17. Stated differently, a connection portion between the front pipe 520 and the lateral pipe 530 may be provided on one lateral side of the cylinder portion 17b and a connection portion between the front pipe 520 and the lateral pipe 540 may be provided on the other lateral side of the cylinder portion 17b in a side view of the motorcycle 500.

More specifically, the connection portion between the front pipe 520 and the lateral pipe 530 may be positioned more on a rear side, in a front-back direction of the motorcycle 500, than a front surface of the cylinder portion 17b. The connection portion between the front pipe 520 and the lateral pipe 530 may be positioned more on a front side, in the front-back direction of the motorcycle 500, than a back surface of the cylinder portion 17b.

The main body portion 520A, the curved portion 520B, and the curved portion 520C may be formed integrally or discretely.

The lateral pipe 530 may be provided between an exhaust hole (exhaust port) 17e provided at the back surface of the cylinder portion 17b and the upstream end of the curved portion 520B. The lateral pipe 530 may include an extension portion 530A and a curved portion 530B. The extension portion 530A may extend from the upstream end of the curved portion 520B toward the rear side of the motorcycle 500. Therefore, the extension portion 530A may be provided on one lateral side (left side) of the engine 17. An upstream end of the extension portion 530A may face the rear side of the motorcycle 500. The curved portion 530B may be U-shaped and curved toward the exhaust port 17e from the upstream end of the extension portion 530A. A downstream end of the curved portion 530B may be connected to the upstream end of the extension portion 530A and an upstream end of the curved portion 530B may be connected to the exhaust port 17e.

The lateral pipe 540 may be connected to the downstream end of the curved portion 520C and may extend from the curved portion 520C toward the rear side of the motorcycle 500. The lateral pipe 540 may be provided between the curved portion 520C and the muffler 23. Therefore, the lateral pipe 540 may be provided on the other lateral side (right side) of the engine 17. The lateral pipe 540 may extend from the curved portion 520C toward the rear side of the motorcycle 500.

As described above, the head pipe 2, the down frame 9, the rear frame 800, and the lower frame 10 may be formed integrally by welding or the like. Therefore, when the motorcycle 500 is manufactured, the engine 17 may be introduced into the region 310 and then attached to the down frame 9, the rear frame 800, and the down frame 10.

As shown in FIG. 5, in the exhaust pipe 22 according to the first embodiment, the left side portion 22d of the U-shaped portion 22c and the left side part of the front portion 22e may be continuously formed, and the right side portion of the front portion 22e and the front part of the right side portion 22f may be continuously formed. The left side part of the front portion 22e and the right side part of the front portion 22e may be fastened by a fastening member 50.

When the motorcycle is manufactured using an exhaust pipe 22 as shown in the first embodiment, instead of the exhaust pipe 510 as disclosed by the fifth embodiment, it may be impossible or difficult to introduce the engine 17 into the region 310 while a part of the exhaust pipe 22 is attached to the engine 17. As shown in FIG. 14, when the engine 17 is mounted to the motorcycle 500, a part of the engine 17 (an upper end of the cylinder head 17c, front, rear, and lower ends of the crank case 17a, and the like) overlaps the down frame 9, the lower frame 10, and the rear frame 800 in a side view. Therefore, when the engine 17 is introduced into the region 310, the cylinder portion 17b of the engine 17 is inclined to a lateral side (to the right or left), and the engine 17 is introduced into the region 310 from a lateral side of the down frame 9, the lower frame, and the rear frame 800.

For example, when using the exhaust pipe 22, the engine 17 cannot be introduced into the region 310 after the U-shaped portion 22c, the left side portion 22d, and the left side part of the front portion 22e are attached to the engine 17, because the U-shaped portion 22c or the left side part of the front portion 22e may bump against the down frame 9, the lower frame and the rear frame 800.

In short, when the U-shaped portion 22c, the left side portion 22d, and the left side part of the front portion 22e are attached to the engine 17, the engine 17 has substantially increased front and rear lengths. Therefore, the engine 17 cannot easily be introduced into the region 310. Therefore, the exhaust pipe 22 must be attached after the engine 17 alone is introduced into the region 310 and then fixed to the down frame 9, the lower frame 10, and the rear frame 800. This may complicate the operation of attaching the exhaust pipe 22.

Moreover, the end 22a of the exhaust pipe 22 may be fitted into the exhaust port 17e of the engine 17. Therefore, a tip end portion of the end 22a of the exhaust pipe 22 usually extends a prescribed distance in the front-back direction of the vehicle. The tip end portion of the end 22a can be stored in the exhaust port 17e. In order to assemble the exhaust pipe 22 into the engine 17 in advance, a distance between the end 22a and a rear portion of the front side portion 22e should be configured to be at least the size of the cylinder portion 17b in the front-back direction plus the prescribed distance. After the exhaust pipe 22 is assembled to the engine 17, an unused space corresponding to the size of the tip end portion of the end 22a is formed between a front wall of the cylinder portion 17b and a rear portion of the front side portion 22e. Therefore, the engine 17 wastes space, by requiring more area in the front-back direction to accommodate the assembly of the exhaust pipe to the engine. In addition, the region 310 is wastefully increased in size in order to store the engine 17, that has now an increased size.

On the other hand, the exhaust pipe 510 according to the fifth embodiment can be introduced into the region 310 while the front pipe 520 is attached to the engine 17. This is because the attached front pipe 520 substantially increases the length of the front part of the engine 17 but the rear length of the engine 17 is unchanged.

The engine 17 attached with the front pipe 520 may be introduced into the region 310 and attached to the rear frame 800, the down frame 9, and the lower frame 10. Referring to FIGS. 14 and 15, an upstream end of the front pipe 520 may be provided on one lateral side of the cylinder portion 17b, and a downstream end of the front pipe 520 may be provided on the other lateral side of the cylinder portion 17b at the same time.

Then, the lateral pipes 530 and 540 are attached. The upstream end of the front pipe 520, in other words, the upstream end of the curved portion 520B, may be provided on one lateral side of the cylinder portion 17b (on a left side of the motorcycle 500). Therefore, the lateral pipe 530 can readily be attached to the front pipe 520 on a lateral side of the cylinder portion 17b. A downstream end of the lateral pipe 530 does not have to be inserted between the down frame 9 and the front surface of the cylinder portion 17b.

Similarly, the downstream end of the curved portion 520C is provided on the other lateral side of the cylinder portion 17b (on a right side of the motorcycle 500), and therefore the lateral pipe 540 can readily be attached to the front pipe 520 on a lateral side of the cylinder portion 17b. An upstream end of the lateral pipe 540 does not have to be inserted between the down frame 9 and the front surface of the cylinder portion 17b.

As in the foregoing, the upstream and downstream ends of the front pipe 520 may each be provided on a lateral side of the cylinder portion 17b, so that the lateral pipes 530 and 540 can readily be attached to the front pipe 520. This can make the operation of attaching the exhaust pipe 510 easier than the operation of attaching the exhaust pipe 22.

Furthermore, as shown in FIG. 15, an upstream end of the lateral pipe 530 opens toward the front side FWD of the motorcycle 500 similar to the downstream end of the lateral pipe 530. More specifically, an axial line 520BL of the upstream end of the front pipe 520, an axial line 530AL of the downstream end of the lateral pipe 530, an axial line 530BL of the upstream end of the lateral pipe 530, and an axial line 17eL of the exhaust pipe 17e extend in the front-back direction of the motorcycle 500 and are preferably parallel to one another in a plan view. Therefore, after the lateral pipe 530 is provided in the vicinity of its attachment position, the pipe is pushed in the forward direction FWD of the motorcycle 500, so that the upstream end of the lateral pipe 530 is connected to the exhaust port 17e and the downstream end of the lateral pipe 530 is connected to the upstream end of the curved portion 520B. Therefore, when the lateral pipe 530 is provided in the vicinity of an attachment position and then pushed toward the advancing direction FWD of the motorcycle 500, the upstream end of the lateral pipe 530 may be connected to the exhaust port 17e, while the downstream end of the lateral pipe 530 may be connected to the upstream end of the curved portion 520b. Therefore, the lateral pipe 530 can readily be assembled to the front pipe 520 and the engine 17. As used herein, "axial line" refers to a central axis of the upstream end, the downstream end or an opening of the exhaust port. As described above, when the exhaust pipe 510 is used, it is easy to assemble the exhaust pipe 510 to the engine 17, and the engine 17 or the region 310 are not wastefully increased in size. Note that the front pipe 520 may be attached after the engine 17 is provided in the region 310.

Figure 16:
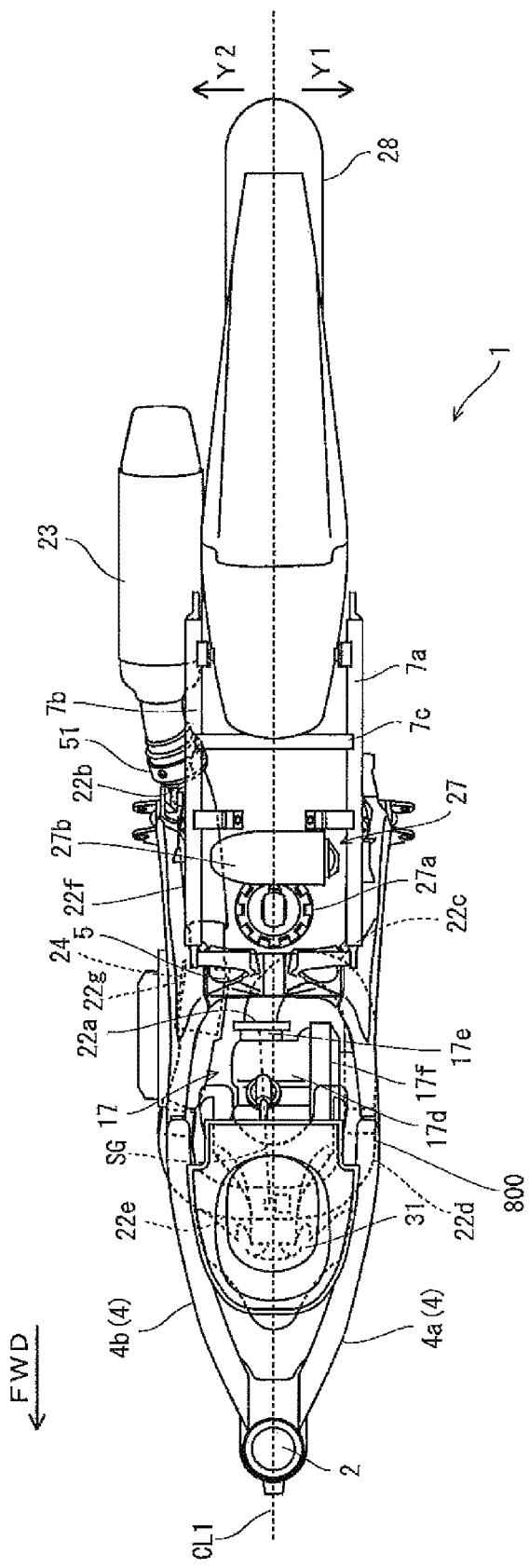
FIG. 16 is a plan view of the motorcycle according to the fifth embodiment.

The cylinder portion 17b may include a cam chain chamber 17f. As described above, the cam chain chamber 17f may be provided at one lateral side of the cylinder portion 17b, i.e., on a left side of the cylinder portion 17b in this example as shown in FIG. 16. When seen from above, a central axis CL1 of the motorcycle 500 in the front-back direction passes through a substantial center of the part of cylinder portion 17b, excluding the cam chain chamber 17f. Therefore, the cylinder portion 17b may be provided shifted to the left from the central axis CL1 by the size of the cam chain chamber 17f. Therefore, a space formed between the rear frame 800 and a side surface having the cam chain chamber 17f of the engine 17 thereon (a left side surface in this example) may be smaller than a space between the rear frame 800 and a side surface without the cam chain chamber 17f of the engine 17 thereon (a right side surface in this example).

As shown in FIG. 15, the exhaust pipe 510 has an inner diameter that increases from upstream to downstream. More specifically, an average inner diameter of the front pipe 520 may be larger than that of the lateral pipe 530 and an average inner diameter of the lateral pipe 540 may be larger than that of the front pipe 520. Therefore, the average inner diameter of the lateral pipe 530 may be smaller than the average inner diameter of the lateral pipe 540.

According to the present embodiment, the lateral pipe 530 may be provided on a lateral side having the cam chain chamber 17f of the cylinder portion 17b, and the lateral pipe 540 may be provided on the side opposite to the side surface having the cam chain chamber 17f. In this way, the lateral pipe 530 may be provided in the smaller one of the spaces formed between the rear frame 800 and the engine 17, and the lateral pipe 540 having a greater inner diameter than the lateral pipe 530 may be provided in the larger one of the spaces formed between the rear frame 800 and the engine 17. Therefore, the motorcycle 500 can be kept from having an increased width because of the exhaust pipe 510.

Structure of Support Member 600

Figure 17:
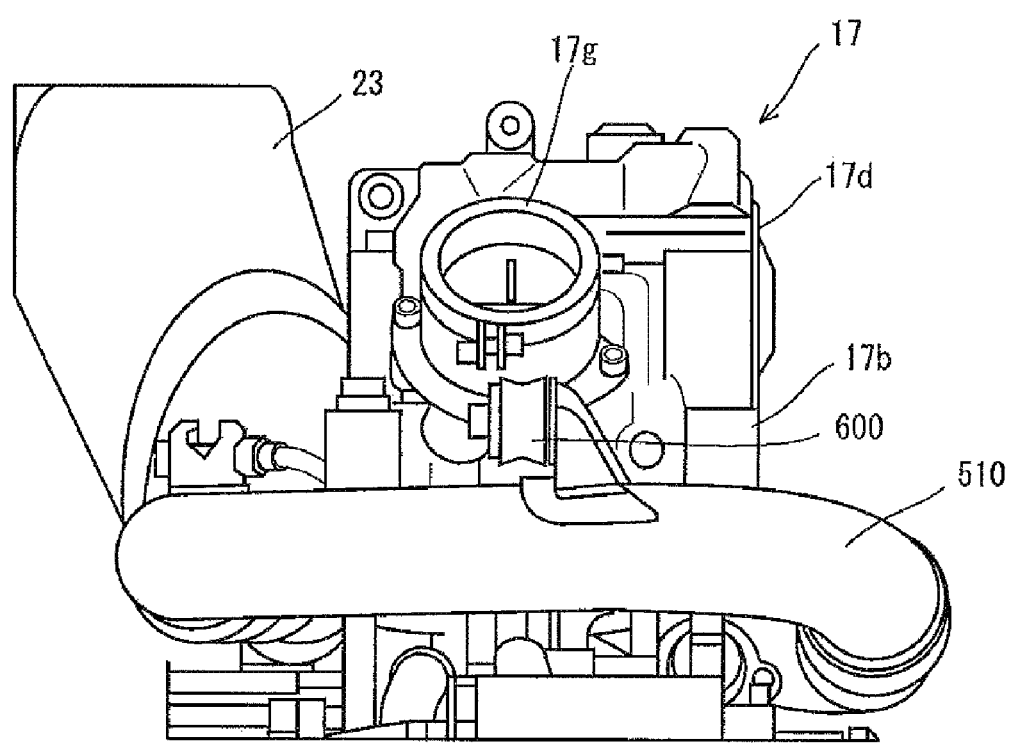
FIG. 17 is a front view and a peripheral portion of the exhaust pipe according to the fifth embodiment.
Figure 18:
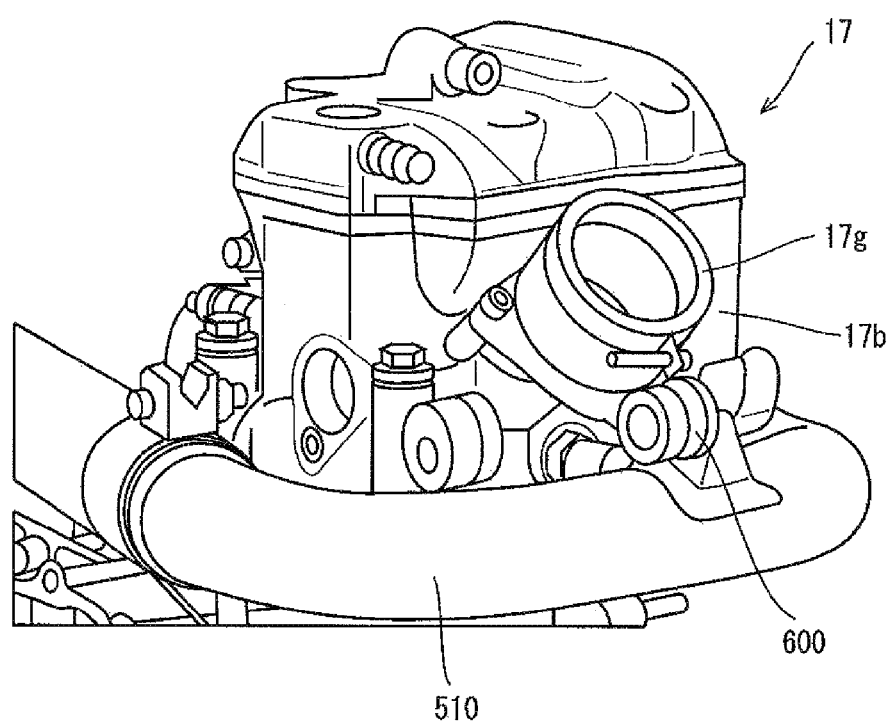
FIG. 18 is a perspective view of the peripheral portion of the exhaust pipe according to the fifth embodiment, as seen from the front upper right.

FIG. 17 is a front view of the exhaust pipe 510 and its peripheral portion. FIG. 18 is a perspective view of the exhaust pipe 510 and its peripheral portion as seen from the front upper right, and FIG. 19 is a perspective view of the exhaust pipe 510 and its peripheral portion as seen from the front upper left.

Figure 19:
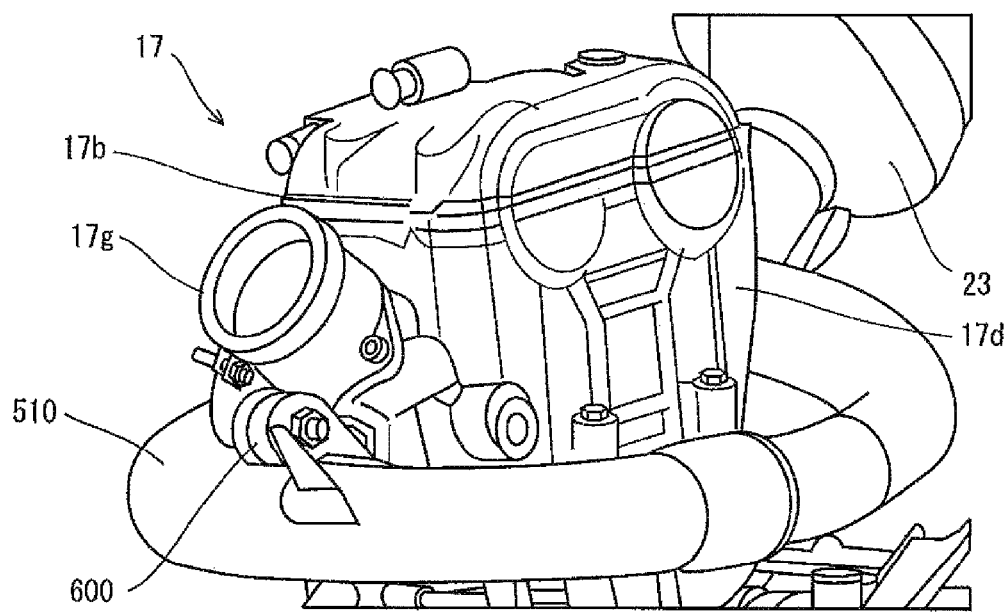
FIG. 19 is a perspective view of the peripheral portion of the exhaust pipe according to the fifth embodiment, as seen from the front upper left.

Referring to FIG. 14 and FIGS. 17 to 19, the support member 600 may be attached at the front surface of the cylinder portion 17b, and supports the front pipe 520. As shown in FIGS. 17 to 19, an intake port 17g may be provided at the front surface of the cylinder portion 17b. The intake port 17g can be connected to an air cleaner 31 through an intake pipe 31A (see FIG. 14). In this example, the support member 600 is attached in the vicinity of an edge of the intake port 17g.

Figure 20:
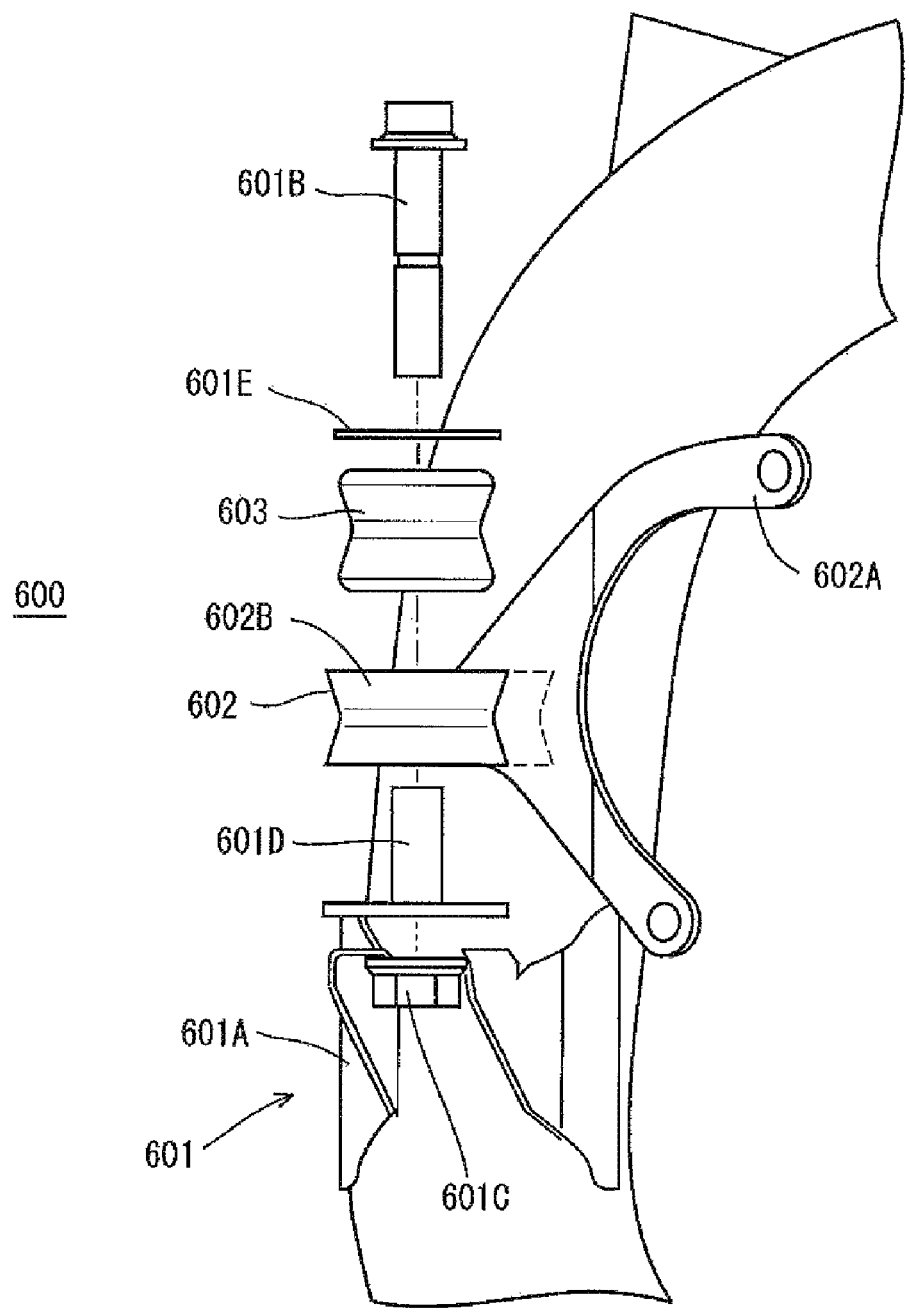
FIG. 20 is an exploded plan view of a support member according to the fifth embodiment.
Figure 21:
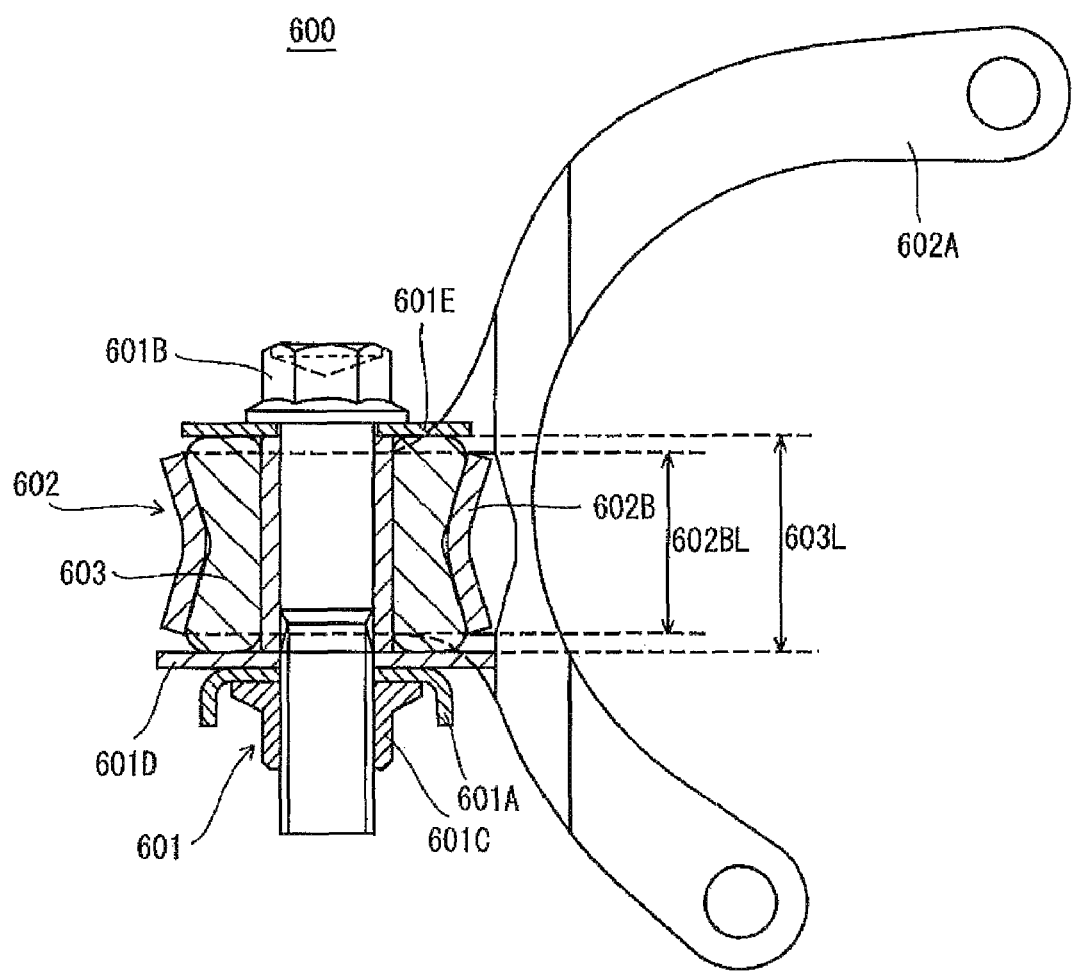
FIG. 21 is a sectional view of the support member according to the fifth embodiment.

FIG. 20 is an exploded plan view of the support member 600, and FIG. 21 is a sectional view of the support member 600. Referring to FIGS. 20 and 21, the support member 600 may include attachment members 601 and 602 and an elastic member 603.

The attachment member 601 may be attached to an upper part of the main body portion 520A of the front pipe 520. More specifically, the attachment member 601 may be attached substantially in the center of the front pipe 520. The attachment member 601 may include an attachment plate 601A, fastening members 601B and 601C, a washer pipe 601D, and a washer 601E.

The attachment member 602 may be attached at the front surface of the cylinder portion 17b. The attachment member 602 may include an attachment plate 602A and a tube member 602B. The attachment plate 602A may be an arch-shaped plate provided around the intake port 17g and fixed to the front surface of the cylinder portion 17b by a bolt. The tube member 602B may be attached to the attachment plate 602A. An axis of the tube member 602B may extend in the widthwise direction of the motorcycle 500.

As shown in FIG. 21, the elastic member 603 may be provided between the attachment members 601 and 602. The elastic member 603 may be tubular and have a through hole in the center. The elastic member 603 may be provided in the tube member 602B. Therefore, the axial direction of the through hole of the elastic member 603 may extend in the widthwise direction of the motorcycle 500. A tubular portion of the washer pipe 601D may be inserted into the through hole of the elastic member 603. The washer 601E may be in contact with one end surface of the elastic member 603, and a washer portion of the washer pipe 601D may be in contact with the other end surface. The fastening members may include a bolt 601B and a nut 601C. The bolt 601B may be inserted into the washer pipe 601D. The nut 601C may be attached to a tip end of the bolt 601B. The fastening members may fix the washer 601E, the elastic member 603, the tube member 602B, the washer pipe 601D to the attachment plate 601A.

Referring to FIG. 16, a segment connecting the support member 600 and a center of the exhaust port 17e may extend in the front-back direction of the motorcycle. More specifically, a segment SG connecting the axial center of the tube member 602B, and the center of the opening of the exhaust port 17e, may extend substantially in the extending direction of the central axis CL1 of the motorcycle 500.

When an exhaust pipe is fixed to a motorcycle in general, a support member for the exhaust pipe may be attached to a lateral surface of the motorcycle. For example, when the exhaust pipe 510 is fixed to the motorcycle 500, the support member may be attached to a left side surface and/or a right side surface of the engine 17, so that the support member supports the lateral pipe 530.

The operation of attaching the support member at the left side surface and/or the right side surface may be easier than attaching the support member to the front side of the engine 17. Furthermore, by attaching the support members at the left side surface and the right side surface, the exhaust pipe 510 can be supported by the two support members. Therefore, vibration transmitted to the exhaust pipe 510 by operation of the engine 17 can be reduced by the support members.

However, when the support member is attached at one lateral surface or both lateral surfaces of the engine 17, and vibration transmitted to the exhaust pipe 510 is reduced by the support member, excess vibration may be transmitted to the support member. Therefore, excess stress may be applied on the support member.

According to the present embodiment, the support member does not reduce vibration from the engine 17 while supporting the exhaust pipe 510, but the support member 600 may be provided at a portion of the exhaust pipe 510 with minimal vibration to support the exhaust pipe 510. Therefore, excess vibration can be kept from being transmitted to the support member 600.

Figure 22:
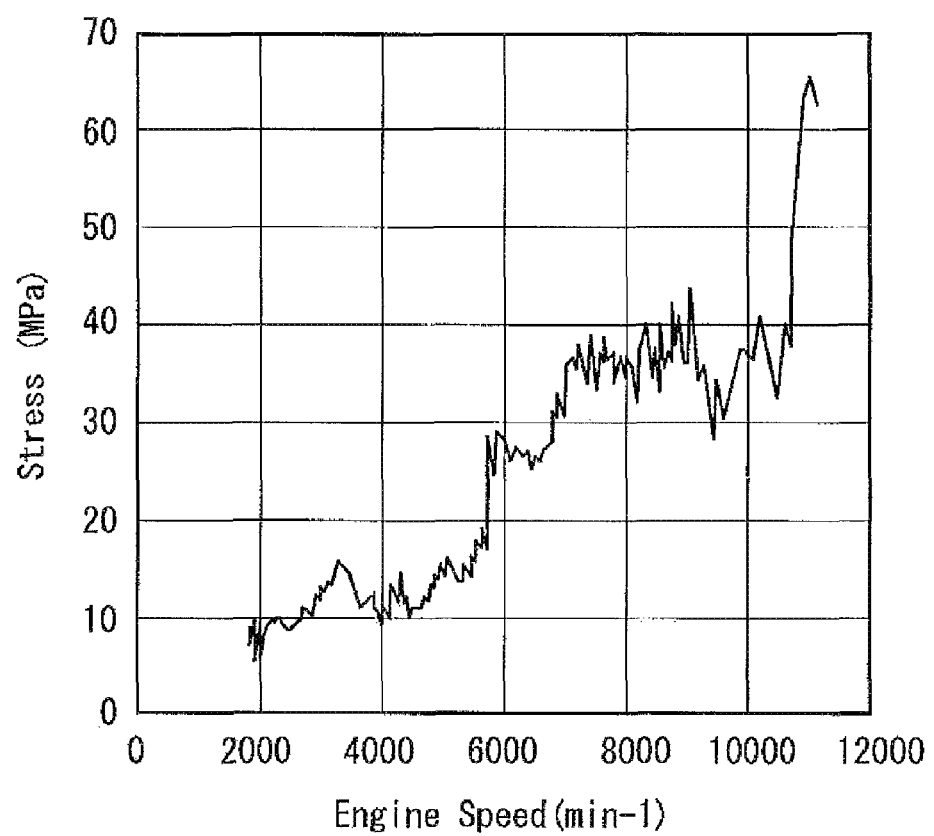
FIG. 22 is a graph showing a relation between stress applied on a support member that supports an intermediate portion of a front pipe of an exhaust pipe, according to the fifth embodiment, and an engine speed of an engine.
Figure 23:
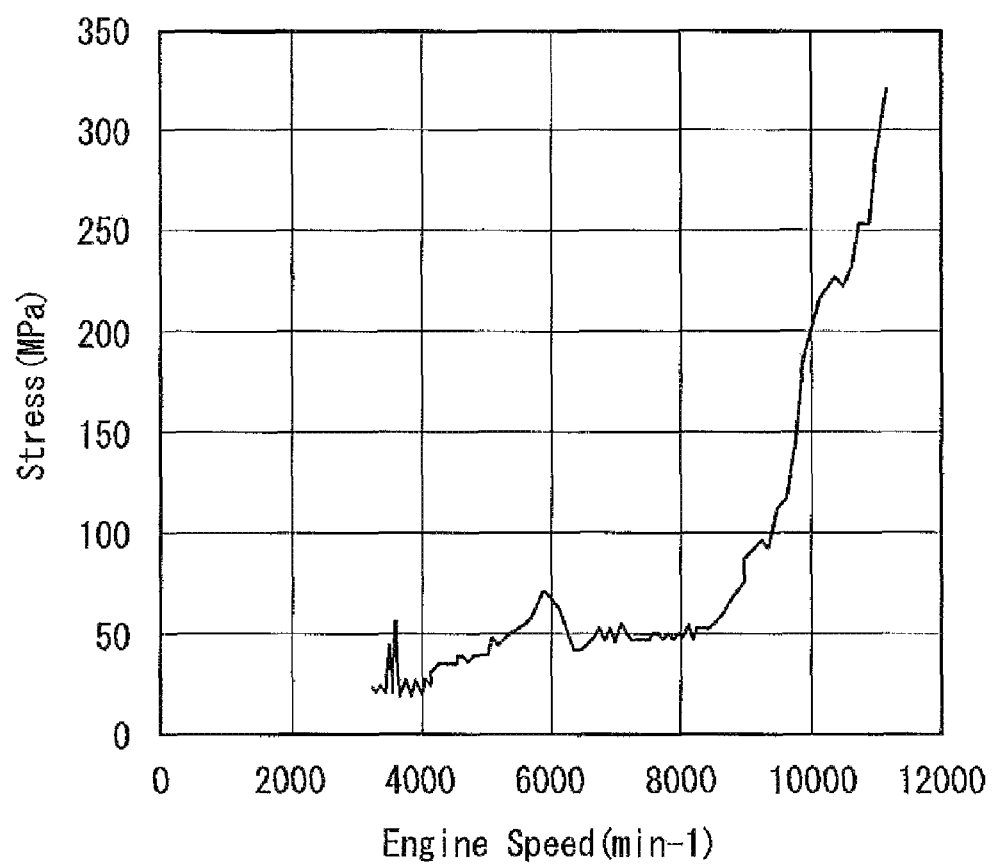
FIG. 23 is a graph showing a relation between stress applied on a support member that supports a downstream end of a lateral pipe of the exhaust pipe, according to the fifth embodiment, and an engine speed of an engine.

FIG. 22 is a graph showing a relation between stress applied on the support member that supports an intermediate portion of the front pipe 520 in the exhaust pipe 510, and an engine speed of the engine 17. FIG. 23 is a graph showing a relation between stress applied on a support member that supports a portion in the vicinity of a downstream end of the lateral pipe 530 in the exhaust pipe 510, and the engine speed of the engine 17.

A result in FIG. 22 was obtained by the following method. An engine 17 having a prescribed size and a displacement was attached with an exhaust pipe 510 with a prescribed size. Then, one end of a support member (bracket) having a prescribed shape was attached to a front surface of the engine 17 and the other end was attached to an upper intermediate portion of a front pipe 520. A part of the bracket attached to the upper intermediate portion of the front pipe 520 was provided with a strain gauge, and stress applied on the bracket corresponding to the engine speed was measured.

A result in FIG. 23 was obtained from the following method. An engine 17 having the same size and displacement as those used in FIG. 22 was used, and an exhaust pipe 510 having the same size as that used in FIG. 22 was prepared. Using a bracket having the same size as that of the bracket used in FIG. 22, one end of the bracket was attached to a lateral surface of the engine 17 and the other end was attached to an upper portion of a part in the vicinity of a downstream end of the lateral pipe 530. A part of the bracket at a connection portion with the lateral pipe 530 was provided with a strain gauge and stress applied on the bracket corresponding to the engine speed was measured.

Referring to FIGS. 22 and 23, stress applied on the bracket attached at the intermediate portion of the front pipe 520 was smaller than stress applied on the bracket attached at the downstream end of the lateral pipe 530. The maximum stress in FIG. 22 was 65.3 MPa, and considerably smaller than the maximum stress in FIG. 23 which was 321.2 MPa.

The following can be deduced from the above results. The exhaust pipe 510 is provided in a coil shape to surround the engine 17. When the exhaust pipe 510 receives vibration transmitted from the engine 17, a part of the exhaust pipe 510 connected with the exhaust port 17e serves as a vibration support. The exhaust pipe 510 rocks to the right and left with respect to an axis in the extending direction of the central axis CL1 (see FIG. 16) from the exhaust port 17e. Therefore, the intermediate portion of the front pipe 520 in the exhaust pipe 510 is the least likely to vibrate.

According to the present embodiment, the support member 600 is provided at the front surface of the cylinder portion 17b. In this case, the support member 600 is provided substantially along an axis in the extending direction of the central axis CL1 from the exhaust port 17e. Therefore, vibration received by the support member 600 is smaller than that in the case in which the support member is provided at a lateral surface of the engine 17.

In short, according to the present embodiment, the support member 600 is provided at a part of the exhaust pipe 510 with less vibration. Therefore, stress received by the support member 600 can be small.

According to the present embodiment, before the engine 17 is attached to the down frame 9, the lower frame 10, and the rear frame 800, the front pipe 520 can be attached to the engine 17. Therefore, the support member 600 can be attached to the engine 17 and the front pipe 520 before the engine 17 is attached to the down frame 9, the lower frame 10, and the rear frame 800. In this way, using the exhaust pipe 510, the support member 600 can readily be attached.

Furthermore, as shown in FIGS. 20 and 21, the elastic member 603 may be provided between the attachment members 601 and 602. The elastic member 603 attenuates vibration from the engine 17. Therefore, vibration transmitted to the attachment member 601 is reduced by the elastic member 603 and the vibration of the exhaust pipe 510 is also reduced.

Furthermore, the elastic member 603 may have a through hole that extends in the widthwise direction of the motorcycle 500, and the attachment member 601 is in contact with an inner surface of the elastic member 603 (a surface of the through hole). Furthermore, the attachment member 602 may be in contact with an outer surface of the elastic member 603 by the tube member 602B. Therefore, the elastic member 603 reduces vibration from the engine 17 in the front-back direction and the up-down direction of the motorcycle 500.

Furthermore, as shown in FIG. 21, the axial length 603L of the elastic member 603 can be larger than the axial length 602BL of the tube member 602B. Therefore, both ends of the elastic member 603 may protrude from the tube member 602B. The washer 601E of the attachment member 601 and the washer pipe 601D may be in contact with both ends of the elastic member 603. More specifically, the attachment member 601 may contact not only the inner surface of the elastic member 603, but also an end surface of the elastic member 603. Therefore, the elastic member 603 can reduce vibration from the engine 17 also in the widthwise direction of the motorcycle 500.

In addition, an intermediate portion of the outer circumferential surface of the tube member 602B may be depressed. Therefore, the elastic member 603 is not easily shifted from the tube member 602B in the widthwise direction of the motorcycle 500.

According to the fifth embodiment, the support member 600 may include the elastic member 603. However, the support member 600 does not have to include the elastic member 603. For example, the support member 600 may be a plate shaped bracket.

According to the fifth embodiment, the tubular elastic member 603 may be used. However, the shape of the elastic member 603 is not limited to the tubular shape. When the elastic member 603 is provided between the attachment members 601 and 602, the elastic member 603 reduces vibration from the engine 17 to some extent.

According to the fifth embodiment, the attachment member 601 may be attached to the front pipe 520, and the attachment member 602 may be attached to the front surface of the cylinder portion 17b. However, the attachment member 601 may be welded to the front pipe 520 or formed integrally with the front surface of the cylinder portion 17b. Similarly, the attachment member 602 may be welded to the front surface of the cylinder portion 17b or formed integrally with the front surface of the cylinder portion 17b.

The front pipe 520 may include a plurality of members or molded integrally. The lateral pipes 530 and 540 may each include a plurality of members or molded integrally.

As long as the support member 600 is provided at the front surface of the engine 17, the above described advantageous effects can be provided to some extent, even if the support member 600 is not provided on an axis extending in the extending direction of the central axis CL1 from the exhaust port 17e.

While the description of the first to fifth embodiments has referred to an off-road type motorcycle (for off-road racing) as an example, embodiments of the invention are not limited to this type of motorcycle and can be applied to an on-road type motorcycle such as a scooter.

While the description of the first to fifth embodiments has referred to an off-road-type motorcycle, embodiments of the invention are not limited to this type of motorcycle and can be applied to other types of vehicles such as an automobile, a tricycle, and an ATV (All Terrain Vehicle) that have an exhaust pipe connected to a rear side of an engine.

According to the first, second, fourth, and fifth embodiments, the exhaust pipe is arranged to extend forward on the left side of an engine, then in front of the engine and then backward on the right side of the engine. In an arrangement symmetric to the foregoing, the exhaust pipe may be arranged to extend forward on the right side of the engine, then in front of the engine and then backward on the left side of the engine.

According to the third embodiment, the extension portion of the exhaust pipe is provided on the left side of the engine but it may be provided on the right side of the engine.

According to the fourth embodiment, the tail pipe is connected to the back side of the exhaust chamber and exhaust gas is discharged outside, while a muffler connected to the tail pipe may additionally be connected. This can further reduce exhaust noise.

While preferred embodiments of the present invention have been described above, it is to be understood that variations and modification will be apparent to those skilled in the art without departing the scope and spirit of the present invention. The scope of the present invention, therefore, is to be determined solely by the following claims.

What is claimed is:

1. A motorcycle, comprising:
   a single-cylinder engine having an exhaust hole at a back surface of the engine; and
   an exhaust pipe connected to a back side of the engine, the exhaust pipe comprising:
      a first portion connected to the exhaust hole and extending forward from the exhaust hole on one side of the engine, with respect to a widthwise direction of the motorcycle;
      a second portion connected to a downstream side of the first portion and extending in front of the engine from the one side to another side, with respect to the widthwise direction of the motorcycle; and
      a third portion connected to a downstream side of the second portion and extending to the back side of the engine along a body of the motorcycle.

2. The motorcycle according to claim 1, wherein at least a section of the third portion of the exhaust pipe is provided above a bottom surface of the engine.

3. The motorcycle according to claim 2, wherein an entirety of the exhaust pipe is provided above the bottom surface of the engine.

4. The motorcycle according to claim 1, further comprising:
   a head pipe; and
   a frame portion provided ahead of the engine and extending backward and downward from the head pipe, the second portion including a portion extending between the engine and the frame portion.

5. The motorcycle according to claim 4, wherein the engine includes a cylinder having an axial line inclined backward with respect to a substantially vertical line.

6. The motorcycle according to claim 4, further comprising a radiator to cool the engine, wherein the second portion is provided under the radiator.

7. The motorcycle according to claim 4, wherein
   the engine includes a cam chain chamber provided on the one side of the motorcycle; and
   the exhaust pipe comprises a catalytic device provided in the third portion arranged on the other side of the motorcycle.

8. The motorcycle according to claim 1, further comprising:
   a rear wheel;

a rear cushioning member provided between the engine and the rear wheel; and an expansion chamber provided between the rear cushioning member and the rear wheel and connected to a rear end of the exhaust pipe.

9. The motorcycle according to claim 1, wherein the engine is a single-cylinder engine.

10. The motorcycle according to claim 1, wherein the motorcycle is a motorcycle for off-road racing.

11. The motorcycle according to claim 1, further comprising:
a head pipe; and
a frame portion provided ahead of the engine and extending backward and downward from the head pipe, wherein the second portion comprises a portion that extends in front of the frame portion.

12. The motorcycle according to claim 11, wherein the exhaust pipe includes a catalytic device provided in the exhaust pipe ahead of the back side of the engine.

13. The motorcycle according to claim 12, wherein the exhaust pipe includes a catalytic device provided in the second portion.

14. An exhaust pipe for a vehicle, comprising:
a rear portion to connect to a rear part of an engine;
an intermediate portion to extend from the rear portion along a first side of the engine;
a front portion to extend from the intermediate portion along a front of the engine; and
an exhaust portion to extend from the front portion along a second side opposite the first side; wherein
the engine is a single-cylinder engine having an exhaust hole at a back surface of the engine.

15. The exhaust pipe of claim 14, wherein the exhaust portion is to connect to a muffler.

16. The exhaust pipe of claim 14, wherein the vehicle is a motorcycle.

17. The exhaust pipe of claim 14, wherein when in place on a vehicle, the front portion passes between the engine and a frame of the vehicle.

18. The exhaust pipe of claim 14, wherein the rear portion includes a U-shaped portion.

19. The exhaust pipe of claim 18, wherein when in place on a vehicle, the U-shaped portion extends toward a rear of the vehicle.

20. A motorcycle, comprising:
a frame, comprising:
a head pipe;
a rear frame that extends obliquely downward from the head pipe toward a back side of the motorcycle;
a down frame that extends downward from the head pipe; and
a lower frame provided between a lower end of the down frame and a lower end of the rear frame,
a single-cylinder engine attached to the frame and being provided in a region surrounded by the head pipe, the rear frame, the down frame, and the lower frame in a side view of the motorcycle, the engine comprising:
a crankcase;
a cylinder portion provided on the crank case and having an axial line inclined backward; and
an exhaust hole provided at a back surface of the cylinder portion; and
an exhaust pipe connected to the single cylinder engine, and comprising:
a front pipe comprising a main body portion provided between a front surface of the single-cylinder engine and the down frame, attached to the single-cylinder engine and extending in a widthwise direction of the motorcycle, a first curved portion curved from an upstream end of the main body portion toward the back side of the motorcycle, and a second curved portion curved from a downstream end of the main body portion to the back side of the motorcycle; and
a first lateral pipe comprising an extension portion provided between the first curved portion and the exhaust hole and extending from an upstream end of the first curved portion toward the back side of the motorcycle, and a third curved portion curved from an upstream end of the extension portion toward the exhaust hole.

21. The motorcycle according to claim 20, wherein the exhaust pipe includes a connection portion between the front pipe and the first lateral pipe, and positioned more on a back side in a front-back direction of the motorcycle than the front surface of the single-cylinder engine in a side view of the motorcycle.

22. The motorcycle according to claim 21, wherein the connection portion is provided on a lateral side of the cylinder portion.

23. The motorcycle according to claim 20, wherein the exhaust pipe includes a connection portion between the front pipe and the first lateral pipe, and positioned more on a front side in the front-back direction of the motorcycle than a rear surface of the cylinder portion in a side view of the motorcycle.

24. The motorcycle according to claim 20, wherein a downstream end of the first lateral pipe is connected to an upstream end of the front pipe,
an upstream end of the first lateral pipe is connected to the exhaust hole, and
an axial line of the downstream end of the first lateral pipe, an axial line of the upstream end of the first lateral pipe, an axial line of an upstream end of the front pipe, and an axial line of the exhaust hole extend in the same direction.

25. The motorcycle according to claim 20, wherein the exhaust pipe further comprises a second lateral pipe connected to a downstream end of the second curved portion and extending from the second curved portion toward the back side of the motorcycle.

26. The motorcycle according to claim 25, wherein the first lateral pipe has an inner diameter smaller than that of the front pipe, and the front pipe has an inner diameter smaller than that of the second lateral pipe,
the cylinder portion further comprises a cam chain chamber provided at a lateral surface of the cylinder portion, and
the second lateral pipe is provided on a side opposite to the lateral surface of the cylinder portion at which the cam chain chamber is provided.

27. The motorcycle according to claim 20, further comprising a support member provided at the front surface of the cylinder portion and supporting the front pipe.

28. The motorcycle according to claim 27, wherein the support member comprises:
a first attachment member attached to the front pipe;
a second attachment member attached at the front surface of the cylinder portion; and
an elastic member provided between the first attachment member and the second attachment member.

29. The motorcycle according to claim 28, wherein the elastic member has a through hole that extends in the widthwise direction of the motorcycle, and has a tubular shape with an inner surface and an outer surface, and one of the first and second attachment members is in contact with the inner surface of the elastic member and another one of the first and second attachment members is in contact with the outer surface of the elastic member.

30. The motorcycle according to claim 29, wherein said another one of the first and second attachment members has a tube member into which the elastic member is inserted.

31. The motorcycle according to claim 30, wherein the tube member has an axial length that is shorter than that of the elastic member, and
said one of the first and second attachment members is in contact with an end surface of the elastic member.

32. The motorcycle according to claim 20, wherein the motorcycle is for off-road racing.

33. The motorcycle according to claim 20, wherein the front pipe is provided between the front surface of the cylinder portion and the down frame.

34. The motorcycle according to claim 20, further comprising a radiator for cooling the single-cylinder engine, the front pipe being provided under the radiator.

* * * * *

UNITED STATES PATENT AND TRADEMARK OFFICE
CERTIFICATE OF CORRECTION

PATENT NO.         : 8,403,100 B2                                   Page 1 of 1
APPLICATION NO.    : 13/025429
DATED              : March 26, 2013
INVENTOR(S)        : Masato Yokoi et al.

It is certified that error appears in the above-identified patent and that said Letters Patent is hereby corrected as shown below:

On the Title Page:
Item (73), should read:

Item (73) Assignee: YAMAHA HATSUDOKI KABUSHIKI KAISHA, Shizuoka-ken (JP)

Signed and Sealed this
Tenth Day of September, 2013

Teresa Stanek Rea
*Acting Director of the United States Patent and Trademark Office*